United States Patent [19]

Ferguson et al.

[11] 4,257,214
[45] Mar. 24, 1981

[54] CROSS FLOW ROTARY MOWER

[75] Inventors: Hugo S. Ferguson, Averill Park; Frank E. Raymond, Grafton, both of N.Y.

[73] Assignee: Duffers Associates, Inc., Poestenkill, N.Y.

[21] Appl. No.: 970,197

[22] Filed: Dec. 18, 1978

[51] Int. Cl.³ ............................................. A01D 35/26
[52] U.S. Cl. ....................................... 56/13.4; 56/295; 56/320.2
[58] Field of Search .................... 56/13.4, 320.1, 320.2, 56/295, 255, 17.4, 202

[56] References Cited

U.S. PATENT DOCUMENTS

| 2,578,880 | 12/1951 | Doyle | 56/320.2 |
|---|---|---|---|
| 2,641,100 | 6/1953 | Sylvester | 56/13.4 |
| 3,002,331 | 10/1961 | Denney | 56/13.4 |
| 3,028,717 | 4/1962 | West | 56/13.4 |
| 3,541,771 | 11/1970 | Schulze | 56/320.2 |
| 3,601,960 | 8/1971 | Buechler | 56/32.2 |
| 3,636,685 | 1/1972 | Speckman | 56/295 |
| 3,828,533 | 8/1974 | Finneran | 56/320.2 |
| 3,905,181 | 9/1975 | Messner | 56/320.2 |
| 4,114,354 | 9/1978 | Morris | 56/295 |
| 4,149,358 | 4/1979 | Comer | 56/13.4 |

FOREIGN PATENT DOCUMENTS 2135976 2/1973 Fed. Rep. of Germany .......... 56/320.2
1163635 12/1956 France .................................. 56/320.2

Primary Examiner—Jay N. Eskovitz
Attorney, Agent, or Firm—Pennie & Edmonds

[57] ABSTRACT

A cross flow rotary mower has a rotor with horizontal outer cutting edges and upwardly extending blower vanes. A conduit having upper, lower and side walls cooperates with the rotor to form a cross flow blower. The rear semi-circle of travel of the rotor is within the conduit. The inlet opens forwardly and has a lateral extent preferably as great as the diameter of the tip circle of the rotor. The cutting edges extend forward of the lower wall, and preferably the lower wall extends to the cutting edges. An extension of the upper wall extends forwardly beyond the tip circle with front and side skirt portions. Means for producing and strengthening vortex air flow are described, and also inlet air flow control vanes. A number of rotors and conduit arrangements with advantageous features are described. These include dual blower vane arrangements. Force-controlled retractable blades mounted on a blade carrier are described which avoid undue cutting forces and also enable the use of thin blades requiring no sharpening.

43 Claims, 35 Drawing Figures

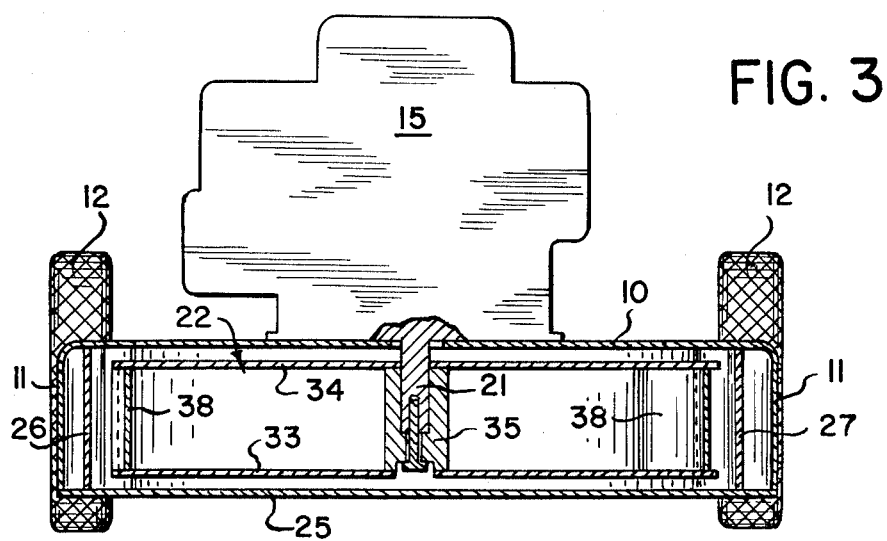
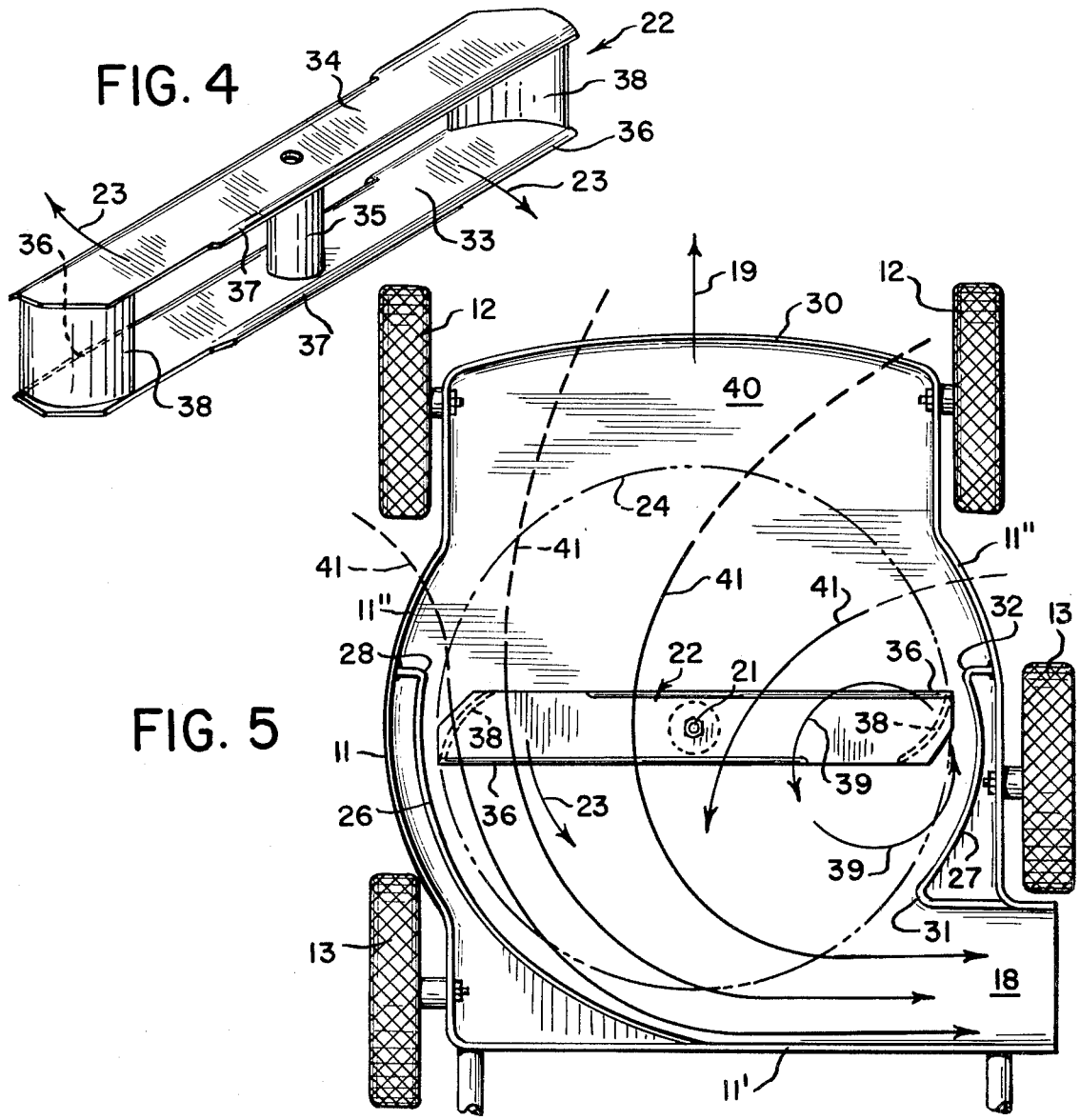

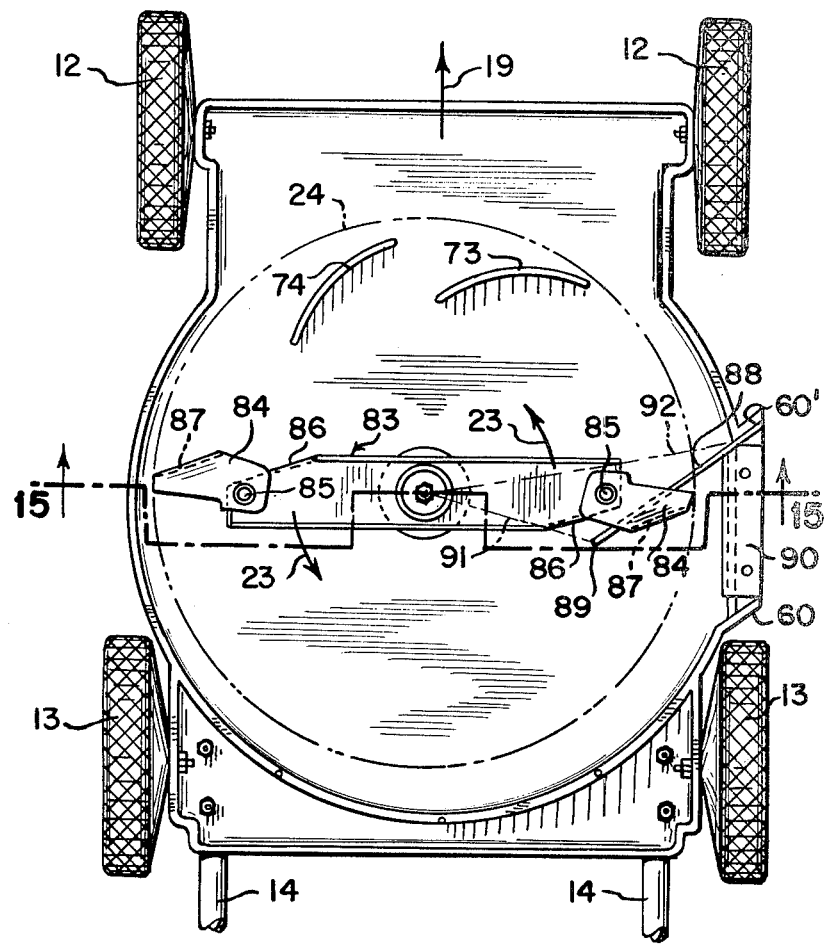
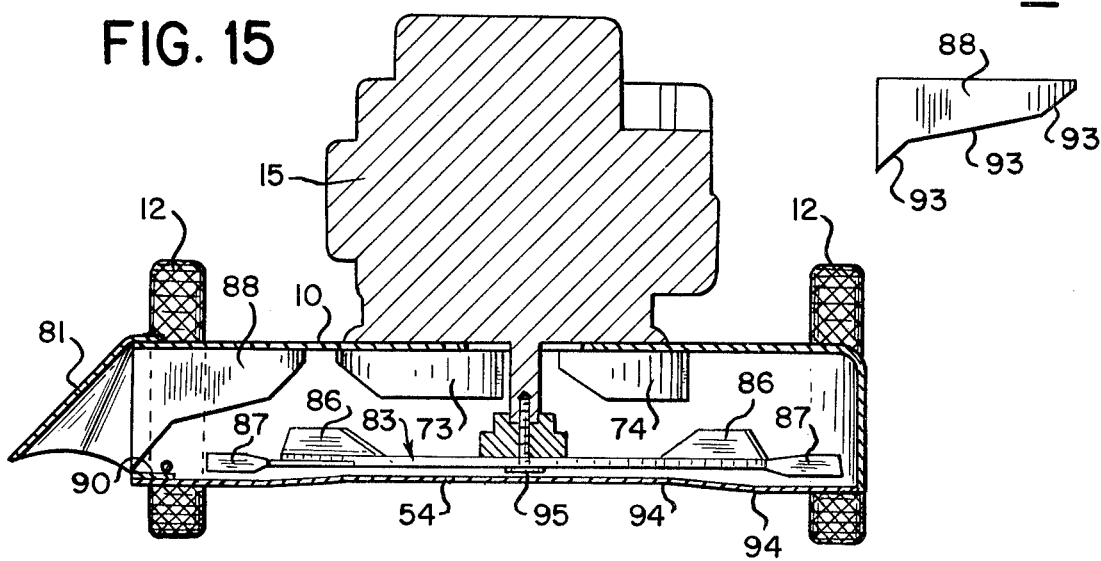

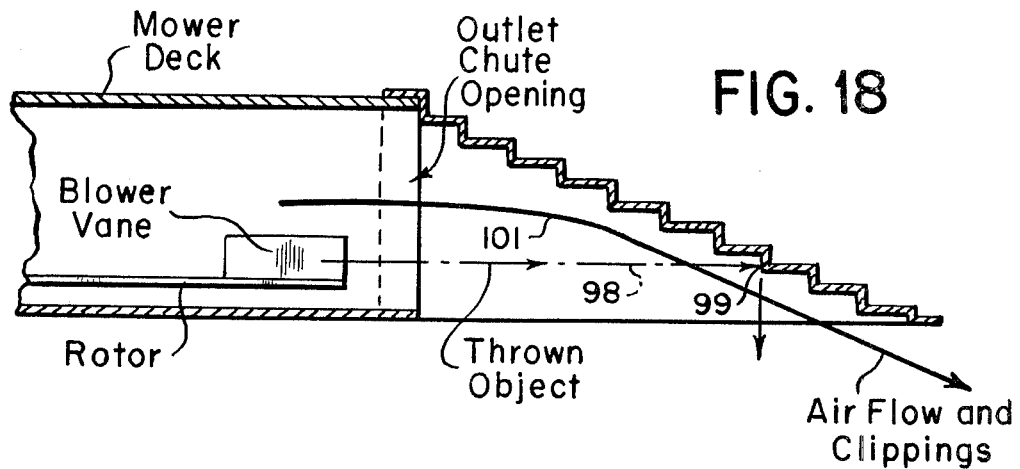
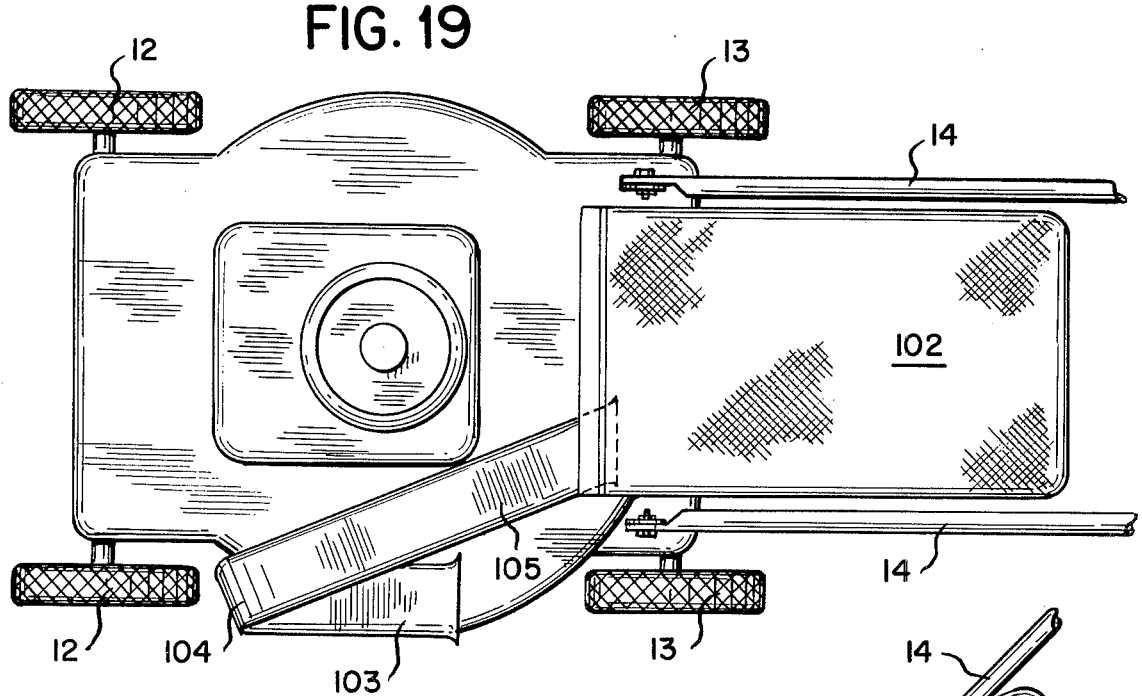
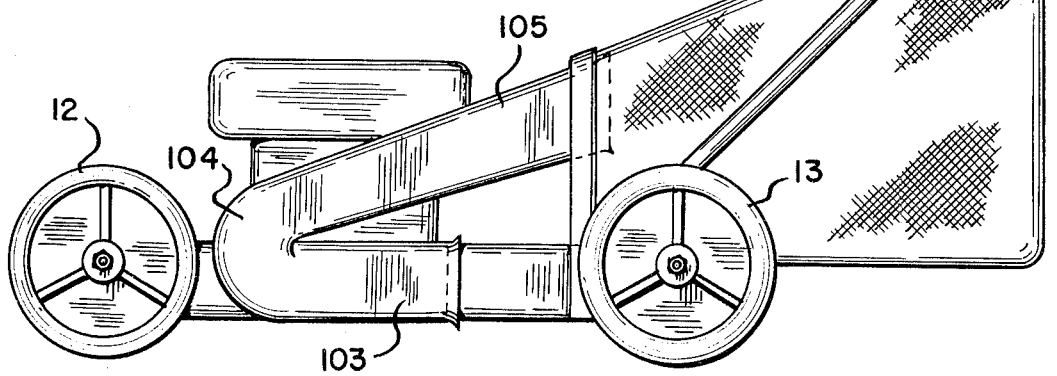

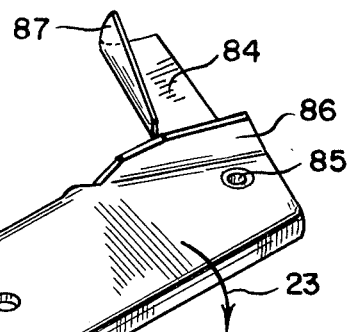
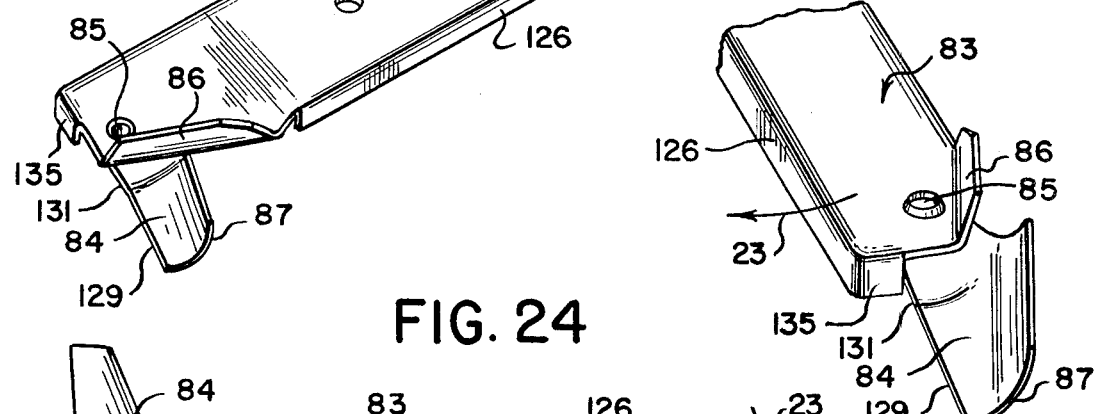
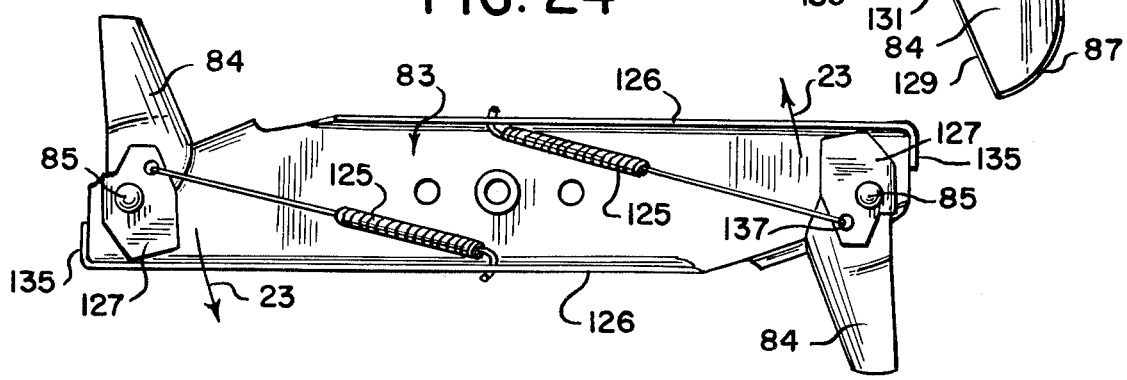
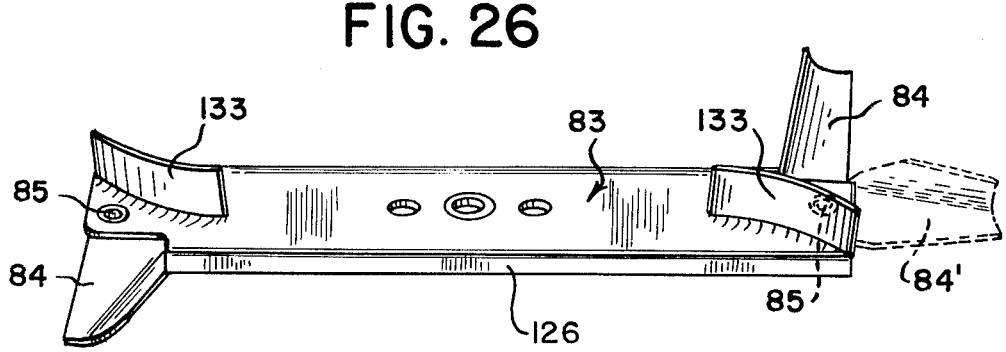

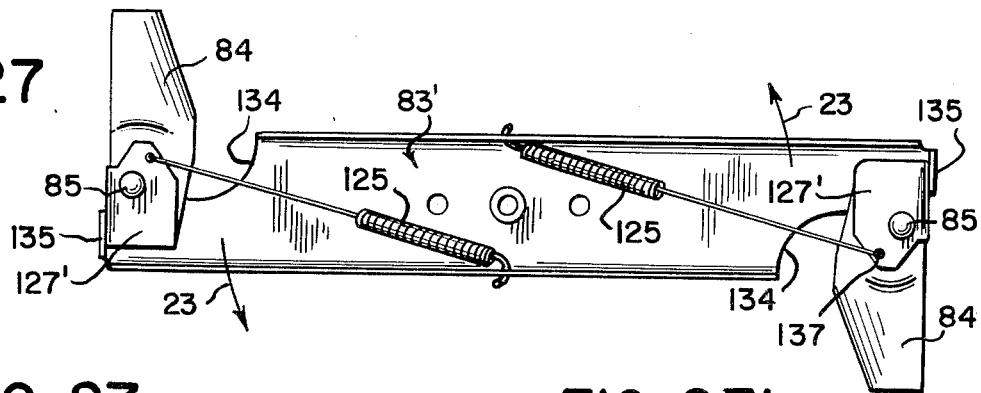
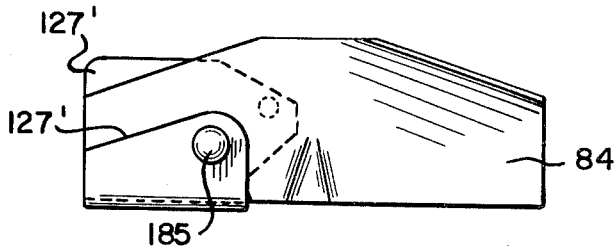
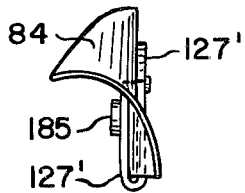
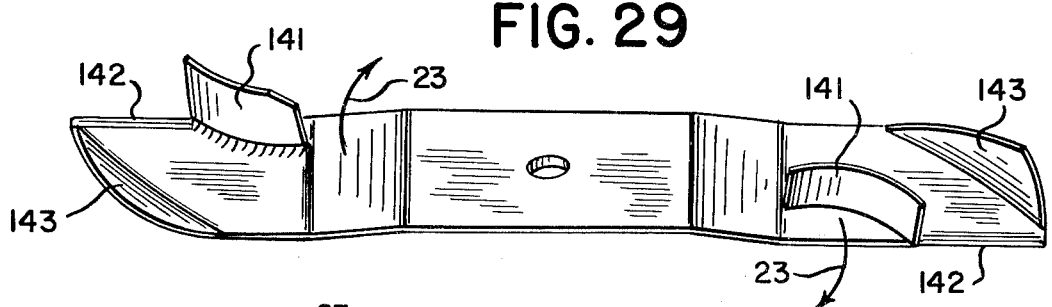
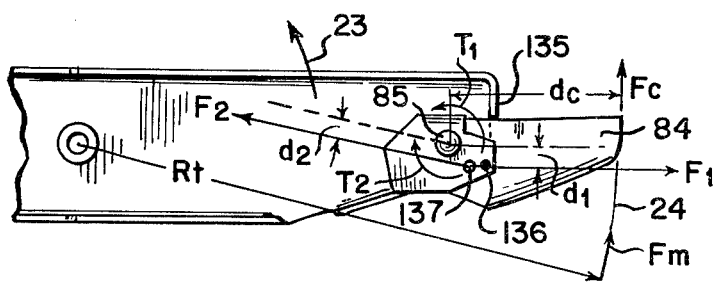
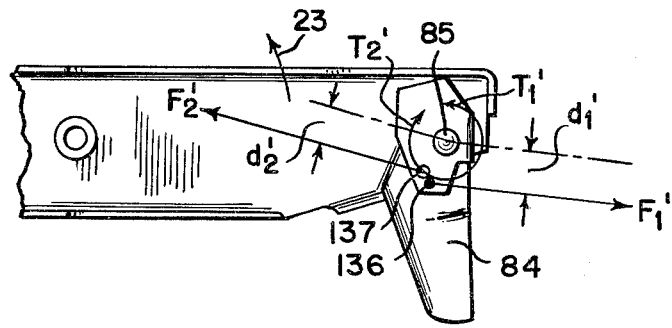

CROSS FLOW ROTARY MOWER

TECHNICAL FIELD

This invention relates to rotary type mowers, and particularly to the inclusion of cross flow blower action in such mowers.

BACKGROUND ART

Rotary mowers currently predominate over other types of mowers, particularly in the home-owner field for mowing lawns. Such a mower conventionally comprises a housing in which a rotor is mounted for rotation about a generally vertical axis. The rotor has outer cutting edges traveling in a generally horizontal plane. Sometimes the cutting plane is slightly tilted downwardly toward the front of the mower, with a corresponding tilt of the vertical axis. Such tilts are included herein within the horizontal and vertical terminology. Also the terms are with respect to ground, since both level and sloping surfaces may be mowed.

The housing conventionally has a deck with a downwardly extending skirt. A gasoline or electric motor is mounted on the deck, with a vertical shaft to which the rotor is attached. In tractor units, power takeoff may be provided from the tractor motor.

In rotary mowers cutting is accomplished by the high speed impact of the cutting blades on the grass. In the past, tip velocities exceeding 20,000 feet (6100 meters) per minute have often been employed. Such mowers have been recognized to be highly dangerous to the feet (or hands) of a user, and to nearby persons since stones, etc. may be thrown with great velocity. Nevertheless, the relative simplicity and lower cost as compared to reel and other types of mowers, the greater ease of sharpening, and the ability to cut tall as well as short grass, has resulted in widespread use of the rotary mower.

In recent years efforts have been made to reduce the danger of rotary mowers. Thus, lower tip velocities have been employed and the skirt extended below the cutting plane of the blades. Such changes have commonly resulted in poorer mowing performance. Various expedients have been employed to improve the mowing. One expedient is the use of lift blades to create an up draft to stand up the grass so that it can be cut more effectively, and to provide an air flow to remove the clippings and avoid clogging the mower. In the lift blades, trailing portions of the cutting blade tips are tilted upwardly.

Unfortunately the lift created by the upward tilt is accompanied by a "blow down" due to the tip vortex generated as a result of the lift. This is air rushing downward off the end of the blade tip to neutralize the low pressure created under the end of the blade by the lifting action. In general, the greater the lift, the greater the blow down. Such blow down tends to blow grass away from the tip, and thereby reduces the cutting effectiveness at the tip.

The blow down can be reduced by closely spacing the skirt of the mower to the tip circle of the rotating blades or inserting a closely spaced wall in the housing, and extending the skirt and/or wall below the blade tip. However, the skirt or wall then impairs the ability of the grass to reach the blade tip, particularly tall grass. One result is to reduce the effective width of cut of the mower. For example, a mower with a 21 inch (53.5 cm) diameter blade may cut a flat swath only 15 to 18 inches wide (38 to 46 cm). Another result is the tendency in moderately high grass to leave uncut or partially uncut grass under the front half of the blade circle, relying on completing the cutting as the rear half of the blade circle passes over the grass. Thus covering the bottom of the rear half of the blade circle may markedly impair the finished appearance of the lawn. The build up of pressure in the space between the rotor and the deck above it may further increase the blow down problem. Also, with high lift blades, circumferential air flow may cause the grass to bend down in the direction of blade travel.

It has also been suggested to pivotally mount metal cutting blades on a blade carrier so that they can swing back upon striking an object. So far as we are aware, such blades are still capable of exerting very high forces on an object, and severe damage to the cutting edges may result.

Flexible cutting elements such as filaments of nylon, etc. have been employed to reduce hazards, mounted on a rotor and driven at high speeds so as to provide cutting edges traveling in an essentially horizontal plane during mowing. In general such mowers are believed to be less than satisfactory under various mowing conditions encountered in practice, and have disadvantages of their own. Among these are difficulties in handling the grass clippings.

Other expedients have been suggested to reduce the danger of rotary mowers while preserving adequate mowing performance. Frequently more complicated and expensive structures have resulted and/or the resultant performance leaves much to be desired.

U.S. Pat. No. 3,673,773 to Hugo S. Ferguson, one of the present inventors, discloses a cross flow mower employing a cylindrical reel rotating about a horizontal axis. U.S. Pat. No. 3,818,684, also to Ferguson, gives further details of the air flow in such mowers, including the vortex generated inside the reel and the inlet flow of air. In such mowers the blower blades have their leading edges sharp to form the cutting edges for mowing the grass. The internal vortex flow is in generally vertical planes spaced along the reel axis, and the flow of air in the inlet region is in generally vertical planes perpendicular to the reel axis with upward components perpendicular to the reel axis.

Although the aforesaid functioning of the horizontal reel cross flow mower would appear to render cross flow operation inapplicable to rotary type mowers, it has now been found possible to incorporate cross flow blower action in a rotary mower in such a manner as to greatly improve the safety of the mower while preserving excellent mowing performance and handling of clippings without plugging.

DISCLOSURE OF THE INVENTION

In accordance with the invention, a cross flow rotary mower comprises a rotor mounted for rotation about a generally vertical axis and driving means therefor. The rotor during normal mowing has generally horizontal outer cutting edges and upwardly extending blower vanes spaced outwardly from the rotor axis. Upper, lower and side walls form a conduit cooperating with the rotor to form a cross flow blower having an inlet region and an outlet region angularly spaced downstream from the inlet region. The inlet region opens in the forward direction of travel of the mower and has a lateral extent at least as great as a major portion of the tip circle diameter of the rotor during normal mowing, with inward flow of air substantially throughout the inlet region. Preferably the lateral extent of the inlet region is approximately as great as the tip circle diameter. The cutting edges and blower vanes travel within the conduit during at least substantially a semi-circle of rotation of the rotor. An extension of the upper wall extends forward substantially beyond the tip circle of the rotor and front and side skirt portions extend downwardly from the extension.

The extent of the lower wall is a substantial portion of the area of rotation of the rotor including substantially the semi-circle of travel of the cutting edges rearward of the inlet region and the cutting edges extend beyond the lower wall in a major portion of the forward semi-circle of travel of the cutting edges during normal mowing operation. The conduit includes means cooperating with the rotor for producing vortex air flow on one side of the rotor axis near the region where the blower vanes pass from the outlet to the inlet regions.

Advantageously the deck of the mower forms the upper wall of the conduit and extends over the forward semi-circle of travel of the cutting edges and substantially therebeyond, with side walls extending downwardly and a bottom wall extending between the side walls beneath the rotor to form the blower conduit. Front and side skirt portions extend downwardly from the forward portion of the deck, preferably to or below the plane of the cutting edges.

Advantageously the extent of the lower wall of the conduit includes a major portion of the forward semi-circle area of travel of the rotor inside the cutting edges, with the cutting edges extending therebeyond during normal mowing operation.

As will be understood from the structure described so far, the rear half of the rotor travel is within the conduit walls and practically completely shields the operator both from contact with the blades and from flying objects struck by the blades. The outlet may be positioned so that any exiting objects are thrown away from the operator position, and in any event can be provided with a protective cover or connected to a bag. Also, with front and side skirt portions extending to or below the plane of the cutting edges, the possibility of throwing objects in the forward semi-circle around the mower is greatly reduced or largely eliminated.

Further, there is substantial protection against scalping the lawn at the top or bottom of a terrace, etc., particularly when the lower wall extends into the forward semi-circle of blade travel and beneath the rotor.

The air current under the cutting edges in the forward semi-circle has an upward as well as an inward component, as will be described more fully hereinafter, thereby providing a lifting action which facilitates mowing many types of grass, while avoiding substantial "blow down" at the tips.

Various forms of rotors may be employed, and several are described in the specific embodiments. Advantageously the blower vanes extend inwardly and backwardly with respect to the direction of rotation of the rotor. A double deck rotor is described in which the blower vanes are mounted between upper and lower plate members remote from the axis of rotation and preferably at or near the outer ends of the rotor, the outer leading edges of the lower plate being sharp to form the cutting edges. Simpler rotors are described using a single plate with outer blade sections having leading edges forming the cutting edges and blower vanes formed or attached at the outer trailing edges.

Advantageously dual vanes may be used, with the outer trailing edges bent upward to provide some lift and/or blower action and separate blower vanes spaced inward from the tip circle of the rotor. With the lower wall extending forwardly inside the cutting edges, the separate vanes preferably are substantially within the forward region of the lower wall, thereby strengthening the blower action.

The simpler rotors need not be much more expensive than those in conventional rotary mowers, if any, and even the more complicated rotors need not be unduly expensive.

The blade sections may be integral with the rotor or turnably mounted thereon. Blade sections with substantially rigid cutting edges and trailing edges bent upward are preferred. However, it is possible to employ rotors with flexible elements, e.g. filaments of nylon, etc., providing the cutting edges, and use the cross flow blower features to improve the mowing and handling of clippings.

The means for producing the internal off center vortex air flow may be portions of the side walls closely spaced from the tip circle of the rotor on opposite sides of the tip circle to divide the inlet and outlet regions of the blower, at least a portion of the side wall on the side where the blower vanes pass from inlet to outlet regions having a gradually increasing spacing toward the outlet region to provide an expansion region.

Advantageously the means for producing vortex air flow includes a vortex air flow control vane extending downwardly from the upper wall of the conduit over the path of travel of the rotor on one side of the axis and adjacent the outlet region. A radius to the inner end of the vane lies angularly ahead of a radius to the outer end with respect to the direction of rotation of the rotor. The control vane may be positioned so that the central region or core of the vortex lies forward or rearward of the vane with respect to the direction of rotation of the rotor, or some intermediate position. The forward location is presently preferred so that the vane is positioned substantially between the air flow to the outlet region and the vortex air flow.

Advantageously, the vortex control vane extends non-radially inwardly and backwardly from adjacent the trailing side of the outlet, in non-parallel relationship with the blower vanes as they pass thereunder. Preferably this orientation is such that inner portions of the blower vanes pass under inner portions of the control vane earlier than outer portions of the blower vanes pass under the outer portions of the control vane. Such a non-parallel relationship helps to reduce blower noise.

These means for producing vortex air flow can be quite simple in structure, and need add little if any cost over conventional rotary mowers.

Unlike conventional cross flow blowers, the blower here used has a short axial length compared to its diameter, and the air supply to the inlet region is largely end fed. Also the inlet region is angularly large, being nearly 180 degrees in the preferred embodiments. Consequently inward air flow may be expected to be non-uniform from point to point of the tip circle of the rotor. The non-uniformity may be acceptable if the air flow at minimum regions is sufficient for cutting purposes. However, inasmuch as the lower wall of the conduit does not extend to the exposed ends of the blades in the forward direction during mowing, some air flow around the tip circle may be produced which is undesirable.

Accordingly, one or more inlet air flow control vanes are advantageously employed which extend downwardly over the path of travel of the outer portion of the rotor in the forward semi-circle of travel thereof, and extend forwardly and inwardly with respect to the direction of rotation of the rotor. The vanes serve to largely block air flow around the tip circle in the inlet region, and guide the air flow into the blower conduit more uniformly. With the lower wall of the conduit extending forwardly, the inlet vane advantageously extends from a radial distance greater than to a radial distance less than and close to respective radial distances to the forward edge of the lower wall in corresponding directions, and preferably the greater radial distance is less than the radius of the tip circle of the rotor.

In accordance with a further feature of the invention, the rotor includes a blade carrier and a cutting blade having a substantially rigid cutting edge turnably mounted on the blade carrier for movement outwardly and forwardly with respect to the direction of rotation of the blade carrier to an extended cutting position, and rearwardly and inwardly to a retracted position. Force control of the turnable blade is provided so that the cutting force which the blade is capable of transferring to an object does not unduly exceed the cutting force required for normal mowing. The cutting blade is approximately counterbalanced and turnably mounted to yield an unbalanced mass effective by centrifugal force to produce a torque on the blade in extended and retracted positions thereof in the same rotational direction as the rotation of the blade carrier. Resilient biasing is provided for producing a torque on the blade in extended and retracted positions in a rotational direction opposite to the rotational direction of the blade carrier.

Advantageously, at normal mowing rotational speeds of the blade carrier, the difference between the torque produced by centrifugal force on the cutting blade in the extended position thereof and the torque produced by the resilient biasing yields a tip cutting force of the blade which is less than a small multiple of the force producible by the driving means at the radius of the tip circle of the blade. Preferably the tip cutting force is approximately equal to the driving motor force.

Advantageously stop means are provided for limiting the forward rotation of the blade to an extended position at which the torque produced by centrifugal force is at least as great as the resilient bias torque, and preferably exceeds it by an amount yielding a tip cutting force at least as great as the force producible by the driving means at the radius of the tip circle.

The retractable blades may be made sufficiently light so that, if an object such as a stone is struck during normal mowing, the blades will move backward toward their retracted positions and impart much less velocity to the object, thus further reducing the danger from flying objects from the forward portion of the mower and protecting the blades from damage. In addition, and importantly, with the proper choice of material the blades may be made of rigid sheet material thin enough to be adequately sharp for effective mowing, thus eliminating initial grinding and resharpening during use, and the force control largely eliminates serious damage during use. Thus blades having a thickness not substantially greater than 0.050 inch, and preferably substantially 0.032 inch or less, may be employed.

With force-controlled retractable blades, and particularly with thin light weight blades, the dual vane arrangements described above are advantageously employed, with the inwardly spaced blower vanes mounted on the blade carrier and trailing edges of the retractable blades bent upward. Also advantageously, the blower vanes on the blade carrier are paired with those on the blades, with a circumferential space between the vanes of each pair.

A blower conduit with a fixed bottom wall is preferred. However, it is possible to use a rotor of disk form as part of the lower wall of the conduit, in conjunction with a fixed plate adequately air sealed with the disk.

The above features and further features will in part be pointed out and in part be understood from the following description of specific embodiments of the invention.

BRIEF DESCRIPTION OF THE DRAWINGS

FIG. 3 is a lateral cross-section along the line 3—3 of FIG. 2;

FIG. 4 shows the rotor used in FIGS. 1-3;

FIG. 5 is a bottom view like FIG. 2 with the bottom plate removed and illustrating the type of air flow in the mower;

FIG. 14 is a view like FIG. 13 with the bottom plate removed;

FIG. 15 is a cross-section along the line 15—15 of FIG. 14 with the bottom plate in place, and FIG. 15a is a detail of the vortex air flow control vane;

FIG. 18 is a detail showing a step-type cover for the outlet;

FIGS. 19 and 20 are top and side views of one form of bagging arrangement;

FIGS. 23 and 24 are perspective and bottom views of a force-controlled turnable blade arrangement using dual vanes at each end; and FIG. 25 is a detail showing one blade extended to its cutting position;

FIG. 26 is a perspective view of a modified force-controlled blade arrangement with dual vanes;

FIG. 27 is a bottom view of a force-controlled turnable blade arrangement using a single vane at each end, and FIGS. 27a and 27b show details thereof;

FIGS. 28a and 28b are force diagrams explanatory of FIGS. 23-27;

FIG. 29 shows a modified blade arrangement with air lift portions;

DESCRIPTION OF THE SPECIFIC EMBODIMENTS

Figure 1:
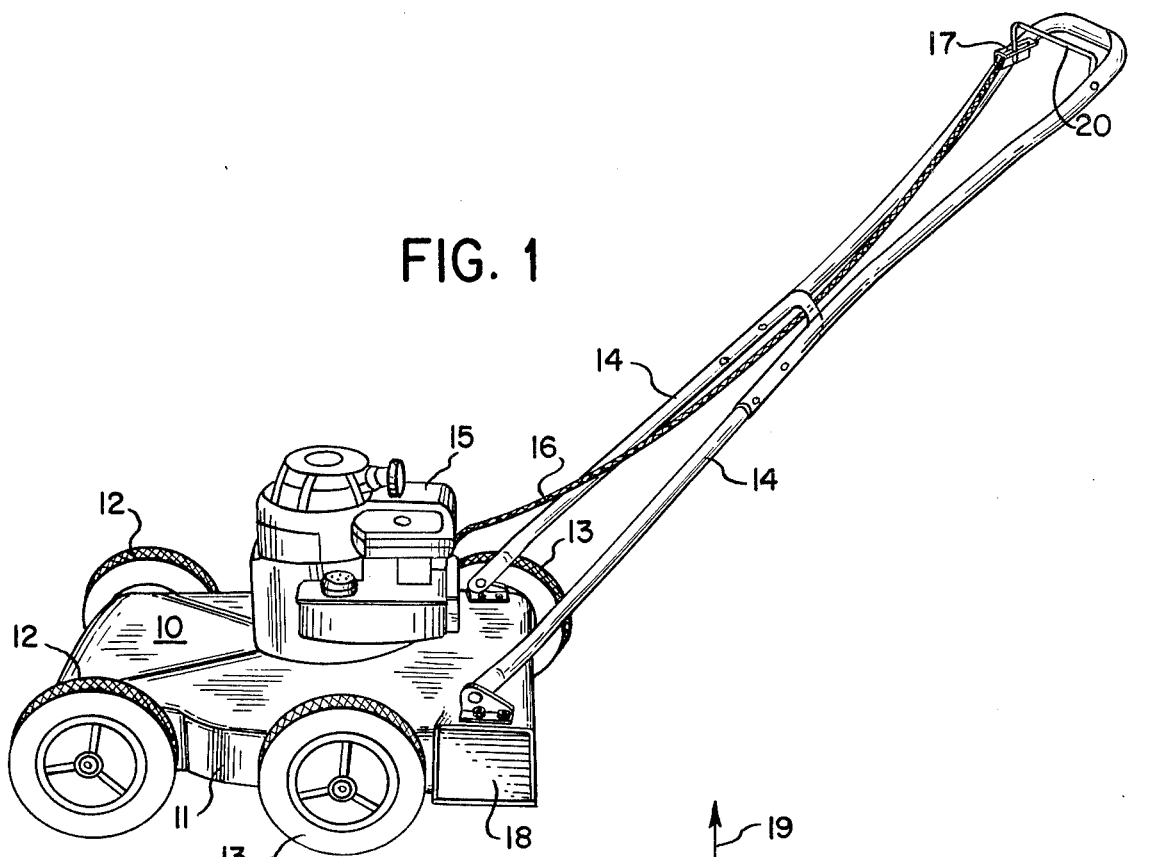
FIGS. 1 and 2 are perspective and bottom views of one embodiment of the invention.

Referring to FIG. 1, a lawn mower is shown having a housing or carriage with a deck 10, skirt 11, front wheels 12, rear wheels 13 and handle 14. Driving means, here shown as a gasoline motor 15, is mounted on the deck 10 and controlled through a cable 16 by a control mechanism 17 attached near the top of the handle. An outlet 18 is shown at the side and toward the rear of the mower for discharging grass clippings. Normally the outlet 18 will be covered or will lead to a bagging arrangement such as described later, but is here shown uncovered for clarity.

Figure 2:
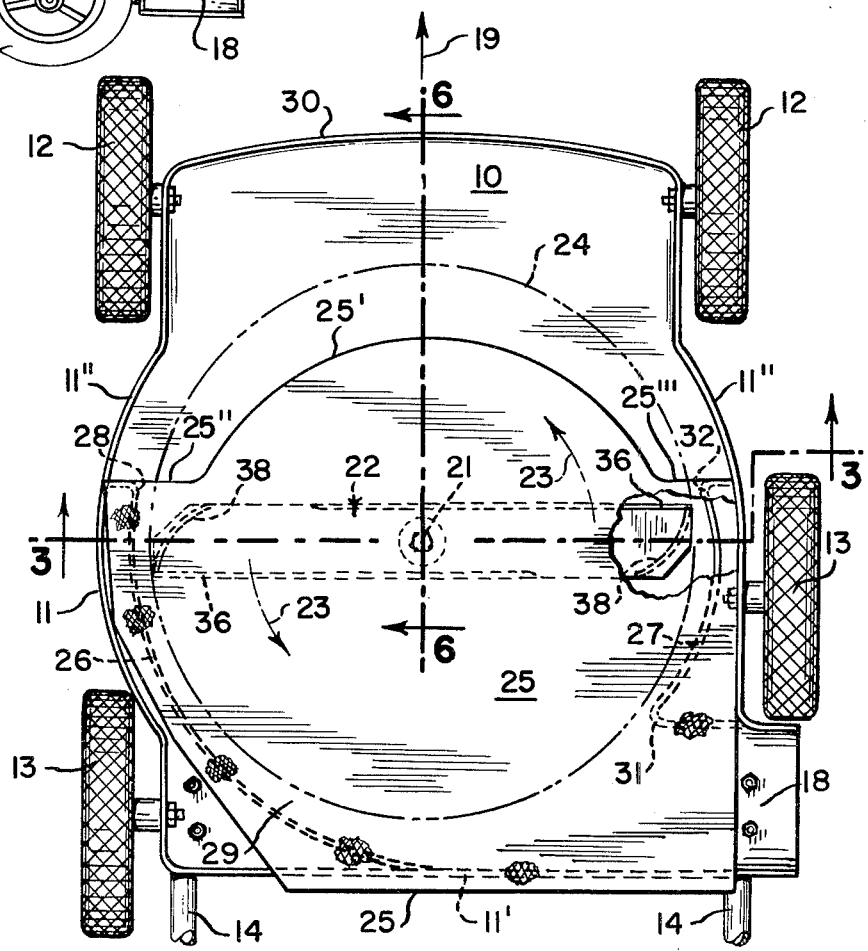

FIG. 2 shows the bottom of the mower, and FIG. 3 a lateral cross-section. Arrow 19 indicates the forward direction of travel. The motor 15 has a vertical shaft 21 to which rotor 22 is attached. The direction of rotation is indicated by arrows 23 and the tip circle by dotdash line 24. A bottom plate 25 is attached to the housing and covers a large portion of the area of rotation of the rotor (the area within the tip circle 24) including the rear semi-circle of travel and substantially the entire forward semi-circle of travel within the cutting edges 36, described below. The front edge 25' of the bottom plate is rearward of the tip circle 24 so that the cutting edges at the outer ends of rotor 22 extend beyond the bottom plate in the major portion of the forward semi-circle of travel.

The bottom plate 25 and the portion of the deck 10 above it extend generally horizontally and form lower and upper walls of a conduit for a cross flow blower. The side walls of the conduit are formed on one side by wall 26 merging with a rear portion 11' of the skirt, and on the other side by wall 27. Walls 26 and 27 extend downwardly from deck 10 and are attached thereto as by welding, or formed integral therewith. The housing could be formed with walls 26 and 27 as part of the skirt, and suitable provision made for mounting wheels 13. Bottom plate 25 may be attached in desired manner, as by bolting, welding, etc., and is here shown as plug welded in place.

Side wall 26-11' is closely spaced from the tip circle 24 at point 28, and thereafter the spacing gradually increases toward the outlet region 18, forming an expansion region 29. This gradual expansion is desirable for good cross flow blower operation. The portion of the side wall near point 28 may be termed the first vortex breaker. As shown, the other side wall 27 is closely spaced from the tip circle at points 31 and 32 with a slightly greater spacing therebetween. The leading edge 31 may be termed the second vortex breaker.

The rotor, best shown in FIG. 4, is a double deck rotor with lower and upper plate members 33 and 34 attached to hub 35. The direction of rotation is indicated by arrows 23. The outer leading edges 36 of the lower plate are sharp to form cutting edges. Intermediate edges 37 may be bent over to add strength. Upwardly extending blower vanes 38 are mounted between the plates at respective ends. Advantageously they extend inwardly and backwardly with respect to the direction of rotation, as shown in FIGS. 2 and 4. Note that the directions of rotation appear reversed in these two figures, since one is viewed from below and the other from above.

Figure 6:
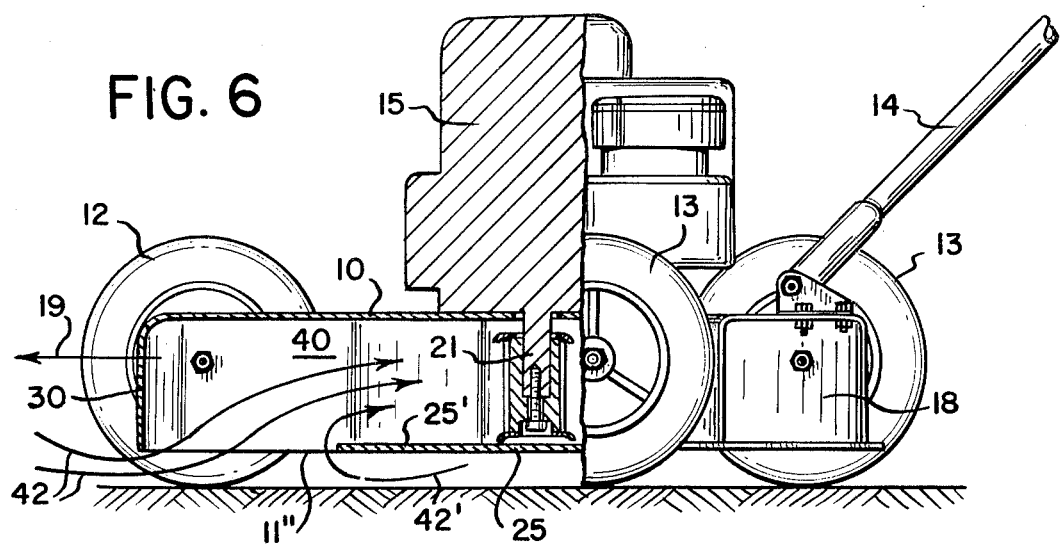
FIG. 6 is a longitudinal cross-section along the line 6—6 of FIG. 2, further illustrating the type of air flow in the mower.

FIGS. 5 and 6 illustrate the general type of air flow present. It should be understood that the air flow patterns may be quite complicated and are difficult to determine and illustrate with complete accuracy. Nevertheless it is believed that the patterns shown will be adequate to explain how the mower functions.

The inlet region of the blower conduit is between the forward edge of the bottom plate 25 (FIG. 2) and the corresponding region of deck 10 thereabove. The lateral extent is from the intersections of the laterally extending forward edge sections 25'' and 25''' with the conduit side walls at points 28 and 32, or approximately the intersections with the tip circle 24. Thus the inlet region opens in the forward direction of travel of the mower, and the lateral extent is approximately as great as the tip circle diameter. The air flows inward substantially throughout the inlet region.

Within the conduit air flow is principally in planes parallel to the deck and bottom plate, although there may be departures in the spaces above and below the rotor. In front of the conduit the air flow has vertical components as shown in FIG. 6. In FIG. 5, dash lines are used for these portions of the air flow. Within the conduit a vortex air flow indicated by arrows 39 occurs on one side of the rotor axis in the region where the blower vanes 38 pass from the outlet region 18 to the inlet region 40. The direction of vortex flow is the same as the direction of rotation of the rotor. Curved lines 41 indicate that the major portion of the air flows in paths from in front of the mower past the blower vanes 38 when they are in the inlet region, then through the interior of the blower, and then past the vanes 38 when they are in the outlet region 18.

Thus the cross flow blower (sometimes called a transverse-flow blower) is characterized by most of the air passing through the blower vanes at least twice in a direction transverse to the axis of the rotor, in passing from inlet to outlet, and is accompanied by a vortex air flow such as indicated at 39. It should be understood that the position and size of vortex 39 may vary from that specifically shown, depending on the detailed design of the blower vanes 38, the housing, the spacings involved, and perhaps other factors. Nevertheless the drawing shows the general character of the air flow produced.

FIG. 6 shows the general character of the air flow in a vertical longitudinal plane through the rotor axis. As best seen in FIGS. 6 and 2, the deck 10 extends beyond bottom plate 25 in the forward direction, and substantially beyond the tip circle 24 of the rotor, thereby forming an extension of the upper wall of the blower conduit. Front skirt portion 30 and side skirt portions 11'' extend downwardly from the extension. Thus air to the blower is largely end fed, and the blower draws air from beneath the skirt portions and into the blower conduit, as shown by arrows 42 and the dash portions of arrows 41 in FIG. 5. Some air may also be drawn into the blower conduit from beneath the forward portion 25' of the bottom plate, as indicated by arrow 42'. As will be observed, this air flow has an upward component which will tend to lift the grass in front of 25', and thereby facilitate the cutting action as the cutting edges of the rotor sweep by. Little if any blow down will be produced at the tips of the rotor as they sweep through the cutting region just ahead of the forward portion 25' of the bottom plate, and any tendency toward blow down will be largely or completely overcome by the inward flow of air to the blower conduit.

As will be recognized, the bottom plate 25, together with deck 10 and the side walls of the blower conduit provide complete protection for the operator during mowing, except possibly at outlet 18. Protection at the outlet will be described later. In the forward semicircle any stones or other objects struck by the exposed portions of the blades beyond the forward edge 25' of the bottom plate will be largely intercepted by the front and side skirt portions 30 and 11'' which preferably extend below the cutting plane of the blades, and in any event will have such a low trajectory as to markedly reduce the danger. The bottom plate 25 also largely prevents lawn scalping. The blower action effectively discharges clippings, etc. so that there is little if any trouble with clogging the mower. The blower action also provides a strong suction action to collect leaves and other loose lawn debris.

Fairly low tip speeds may be employed while maintaining good mowing performance. For example, tip speeds of 10,000 to 13,000 feet per minute have been employed with success, and lower speeds are possible depending on the types and height of grass to be mowed.

It will also be appreciated that the mower is structurally simple, and economical to manufacture. The rotor is somewhat more expensive than those frequently used in conventional rotary mowers. The bottom plate and conduit sides need to be provided, but these are not expensive and may offer trade-offs with foot shields, etc. sometimes used in conventional rotaries.

Figure 7:
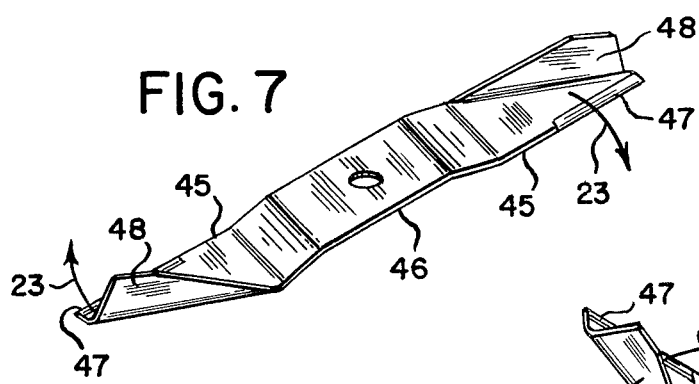
FIGS. 7, 8 and 9 show various alternative types of rotors usable in mowers of the invention.
Figure 8:
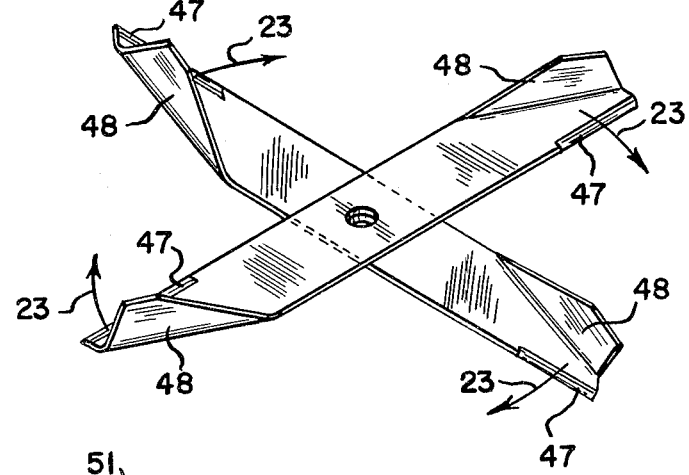
Figure 9:
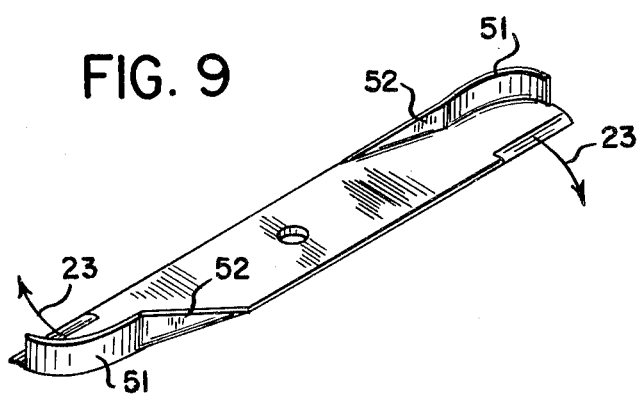

FIGS. 7-9 illustrate simpler types of rotors which may be used instead of that of FIG. 4. In FIG. 7 the outer portions 45 are downwardly offset with respect to the central portion 46 to allow adequate space for attaching the rotor to the motor shaft and reduce the spacing between the cutting edges and the bottom plate. The outer blade sections have sharp leading edges 47. Blower vanes extend vertically upward at the trailing edges of the outer blade sections, and extend inwardly and rearwardly with respect to the direction of rotation 23. The surfaces of vanes 48 may be flat. Desirably there is a bend of substantial radius, say one-half inch, where vane 48 is bent upward from offset 45, to reduce or eliminate separation of air flow at the trailing surface. A similar member inverted and attached to that shown could be used to form a rotor similar to FIG. 4.

FIG. 8 illustrates two blades like FIG. 7, secured together to provide four cutting edges and blower vanes. Such a rotor may be rotated at lower speeds while preserving good performance, albeit at some added expense.

FIG. 9 shows a rotor in which the blower vanes 51 are curved, similar to vanes 38 of FIG. 4. Extensions 52 add strength and also some blower action.

Although reliance may be placed on the close spacing and proper shaping of vortex breakers to produce the vortex air flow, as described in connection with FIGS. 1-6, a vortex air flow control vane may be used to enhance the action of the second vortex breaker. This is particularly useful with the simpler blades of FIGS. 7-9, and also simplifies the side wall construction.

Figure 10:
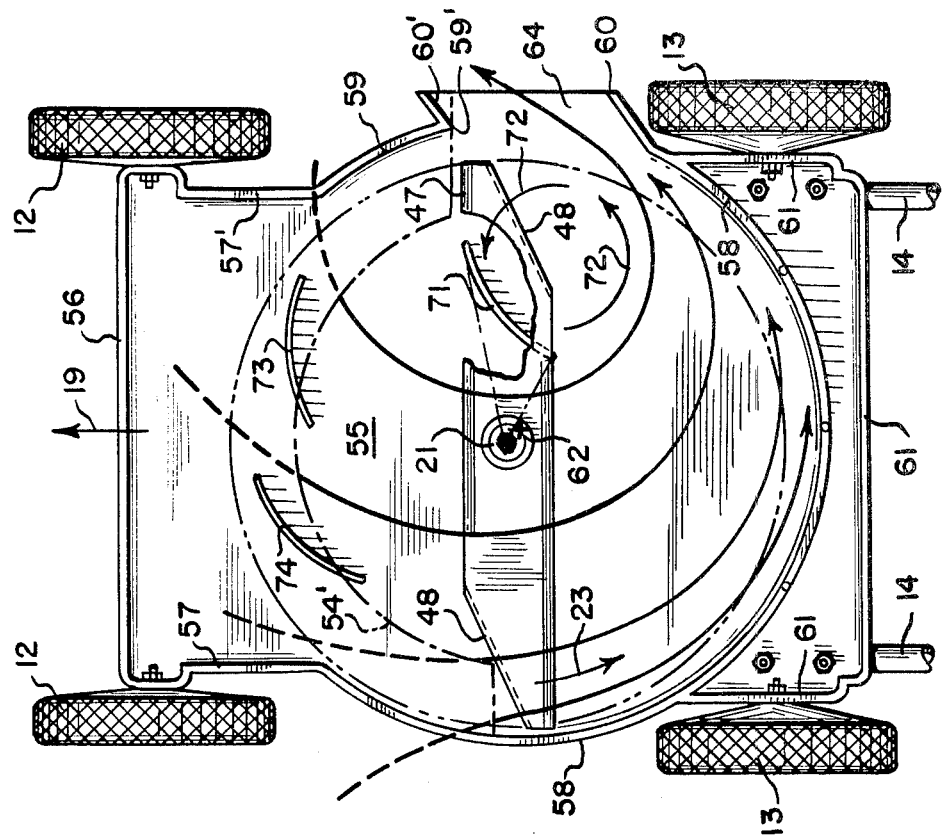
FIGS. 10 and 11 are bottom views, with the bottom plates removed, of embodiments of the invention using air control vanes for enhancing vortex air flow and inlet air flow control vanes, with illustrative types of air flow produced.

FIG. 10 is a bottom view of a modified mower with the bottom plate removed. The outlet has been repositioned as in FIGS. 12 and 13 described below. The bottom plate may be like that of FIG. 13, and the forward portion is indicated by dot-dash line 54'. Here the underside of the deck is designated 55, and has downwardly extending skirts and conduit walls which are separately numbered for convenience. They include front skirt 56, side skirt portions 57, 57', and circular skirt portions 58 and 59. Part of 58 also forms a side wall of the blower conduit. Short wall sections 60, 60' form an outlet chute. These skirt portions 56-60 all extend below the cutting plane. Additional sections 61 provide for mounting rear wheels 13.

Wall sections 58 and 59 may be cylindrical segments centered at point 62. The vertical axle 21 is offset longitudinally and laterally from 62 so that the tip circle 24 lies close to wall 58 at point 63. From point 63, at the forward edge of the bottom plate 54, the side wall 58 gradually separates from the tip circle to the outlet region 64, thereby providing an expansion region 70. Rotor 65 may be one of those shown in FIGS. 7-9, and is shown as that of FIG. 7.

In general, the production of vortex air flow involves air intercepting means adjacent the blower vanes near the region where the blower vanes pass from outlet to inlet regions for producing a vortex rotating in the same direction as the rotation of the rotor. In effect, the vortex largely prevents air flow from outlet to inlet regions on that side of the rotor. In the embodiment of FIGS. 1-4, side wall 27 suffices and the close spacing of portions of the side walls from the tip circle on opposite sides of the tip circle serve to divide inlet and outlet regions of the blower.

In FIG. 10, the differences in the rotor and conduit configurations, including the greater spacing of point 59' from the tip circle 24, may not produce a sufficiently strong and concentrated vortex for good cross flow blower action, and the vortex may be unstable and tend to wander at different rotational speeds and under different mowing conditions.

In such circumstances, a vortex air flow control vane has been found to be of significant value in strengthening and stabilizing the vortex air flow.

In FIG. 10, vane 66 is secured to and extends downwardly from the upper wall of the blower conduit formed by deck 55, and is over the path of travel of the rotor on one side of the rotor axis 21 and adjacent the outlet region 64. In the position shown in FIG. 10, the vortex air flow indicated by arrows 67 lies forward of vane 66 with respect to the direction of rotation indicated by arrow 23, and the vane 66 is positioned substantially between the vortex air flow and the air flow to the outlet region 64 indicated by arrows 68. It should be understood that the vortex air flow may not be as sharply defined as indicated by arrows 67, but may be somewhat more diffuse and the margins may extend somewhat over vane 66. Nevertheless, the predominant vortex air flow lies forward of vane 66.

Figure 11:
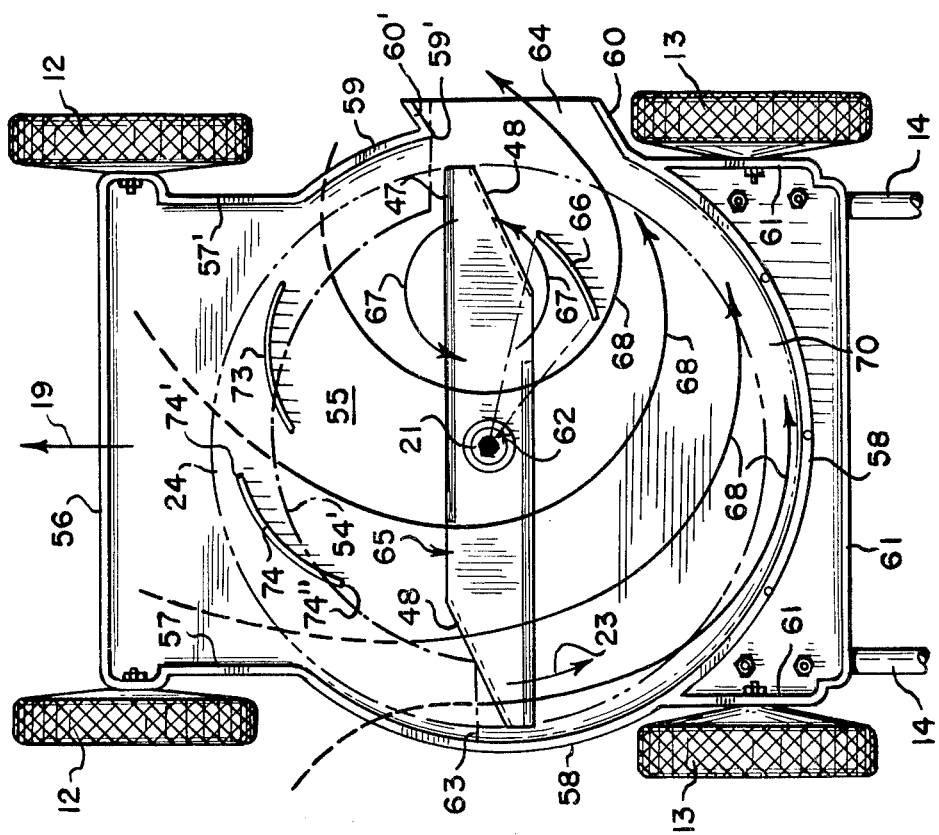

FIG. 11 is similar to FIG. 10, but the position of vortex air flow control vane 71 is further forward angularly than that of vane 66 in FIG. 10, with respect to the direction of rotation 23. With this position, the vortex air flow is predominantly rearward of vane 71 as indicated by arrows 72.

Operation like that shown in FIG. 10 is preferred at the present time. The exact reasons for the difference in operation are difficult to determine and explain accurately. The production of a vortex requires energy as well as room for the vortex. Air flow in both inlet and outlet regions have energy, but in general there is greater energy in the air flowing near the outlet region and the highest velocity is in the outer more peripheral flow of air. The vortex control vane tends to prevent circumferential air flow past the vane. In FIG. 10 the distance of vane 66 from the adjacent portion of side wall 58 gives a cross-section for air flow approximately equal to the cross-section of air flow in the outlet region 64. Thus there is insufficient room for the vortex. However, there is room on the inlet side of vane 66, and the energy in the outlet air flowing past vane 66 develops a vortex with a core or center in the general region indicated by arrows 67.

In FIG. 11 the spacing of vane 71 from wall 58 is considerably greater, and there is room for the vortex on the outlet side of the vane. Thus some of the energy in the air flowing toward the outlet can form the vortex with a core or center in the general region indicated by arrows 72.

Inflowing air may participate in forming the vortex in both FIGS. 10 and 11.

Regardless of the exact reasons, it has been found that either type of operation as illustrated in FIGS. 10 and 11 can be obtained.

Curved vanes as shown by 66 and 71 have been employed with success. However, it is also possible to employ straight vanes. In general it is considered desirable to orient the vane so that a radius to the inner end of the vane lies angularly ahead of a radius to the outer end of the vane, as shown by the dot-dash lines.

FIGS. 10 and 11 further illustrate the use of inlet air flow control vanes. In the forward portion of their travel, the cutting edges and a portion of the blower vanes 48 on the rotor extend forward beyond the bottom plate in the region between the forward edge 54' and the tip circle 24. In this region there may be a circumferential component of air flow, particularly with single deck types of blades such as illustrated in FIGS. 7–9. To reduce or largely eliminate this circumferential component, and direct the air inward in the desired directions, fixed inlet air flow control vanes 73 and 74 are provided which extend downwardly from deck 55 over the path of travel of the outer portions of the rotor. The vanes extend forwardly and inwardly with respect to the direction of rotation 23 of the rotor.

Advantageously, as shown, the radial distance to the outer end 74' of a vane is greater than the radial distance to the forward edge 54' in the same radial direction, and a radius to the inner end 74" is less than and close to the radial distance to edge 54' in that radial direction. This guides air into the conduit without subsequent interference with the cross flow blower action in the conduit. Also, preferably the outer ends are at or inside the tip circle 24 so as not to impede the cutting of tall grass.

The inlet vanes also help to create a more uniform inward air flow at various points along the forward edge of the bottom plate in the cutting region. One or several vanes may be employed if desired, spaced at desired circumferential positions.

Figure 12:
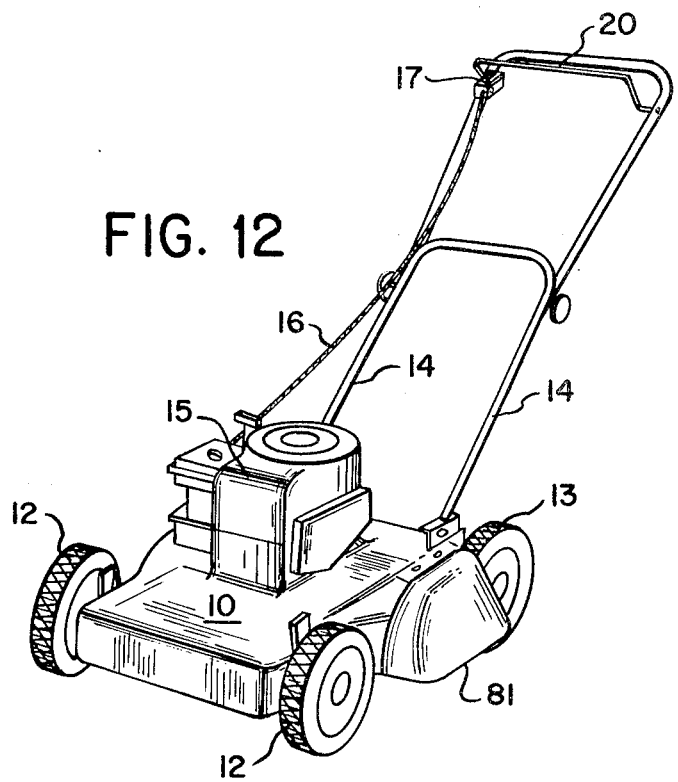
FIGS. 12 and 13 are perspective and bottom views of another embodiment of the invention.
Figure 13:
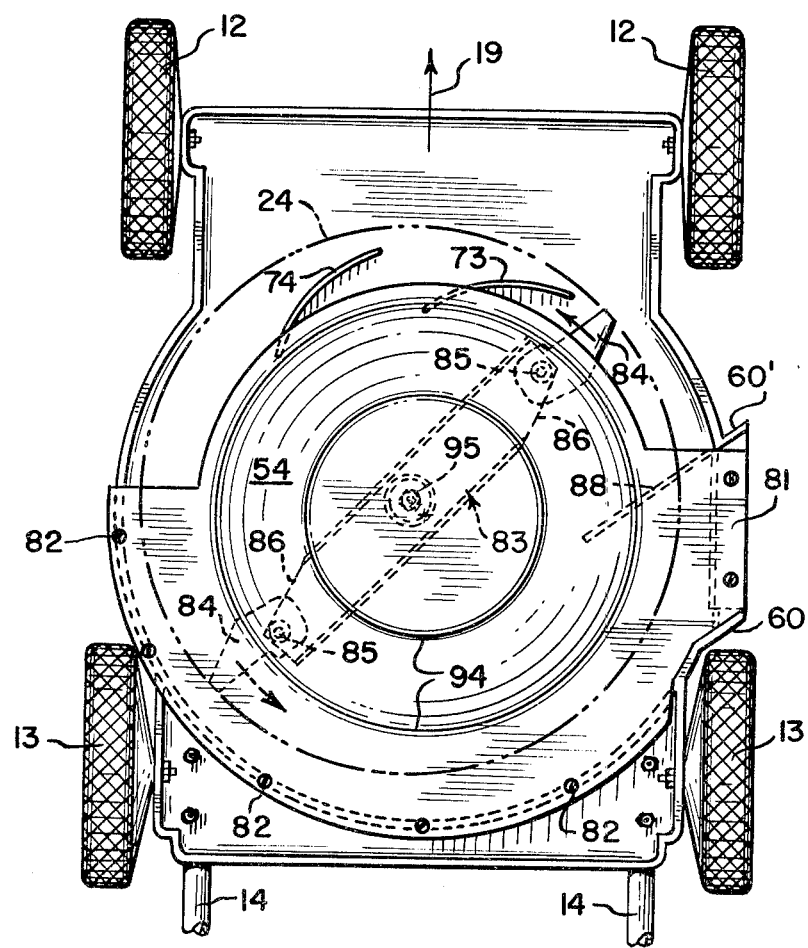

FIGS. 12 and 13 are a perspective and bottom view of a modified embodiment of the invention. FIG. 12 is similar to FIG. 1, but the outlet is now in front of the rear wheel on one side of the mower, and is provided with a cover 81 which deflects the discharged grass clippings and air downward to the ground, and intercepts any stones, etc. which might be thrown through the blower outlet.

As seen in FIG. 13, the skirt and conduit wall configuration is like that of FIG. 10. The bottom cover 54 is shown in place, and is here attached to the conduit walls by screws 82. Inlet air control vanes 73, 74 are employed as in FIG. 10. Here, however, the blade sections of the rotor are turnably mounted, and a modified form of vortex control vane is employed.

FIG. 14 is a bottom view like FIG. 13 but with the bottom plate 54 removed, and FIG. 15 is a lateral cross-section looking forward. The rotor comprises a blade carrier 83 with cutting blades 84 turnably mounted thereon. Although other mounting means could be employed, as here shown the blades are pivoted to the ends of the carrier at 85. With the rotor rotating as shown by arrow 23, at normal mowing speeds the blades are held outward by centrifugal force in the extended positions shown. Blower vanes 86 extend upwardly at the ends of the blade carrier, and the trailing portions 87 of the cutting blades also extend upwardly, thus forming dual blower vanes at each end of the rotor. These features will be discussed later.

A vortex air control vane 88 is provided which in this embodiment is a flat metal vane extending non-radially inward from the trailing side 60' of the outlet. A radius 91 to the inner end 89 lies angularly ahead of a radius 92 to 60'. FIG. 15a is a view perpendicular to the plane of the vane. The slopes 93 on the lower edge are provided so that the air flow and the movement of the blower vanes thereunder tend to clean grass clippings off the vane. The different slopes allow adequately close spacing of the vortex air control vane above the blower vanes with sufficient clearance to prevent the vanes from striking. With vane 88 extending inwardly from adjacent the trailing side of the outlet region, and actually at the outlet region in the embodiment shown, effective air interception is obtained, thereby enhancing the formation of a strong stable vortex. The air flow pattern and vortex position is similar to that shown in FIG. 10.

As seen in FIG. 15, the leading ends of the inlet vanes 73, 74 are also sloped to reduce the accumulation of grass on the vanes.

The bottom plate 54 is advantageously dished upward, as by slight circular bends 94, to strengthen the plate. Also, a bumper 95 is provided beneath the rotor axis so that if the mower passes over rough ground, stones, etc., the bottom plate will not contact the spinning rotor, and especially the cutting blades. A plate 90 is secured at the bottom of the outlet.

Figure 16:
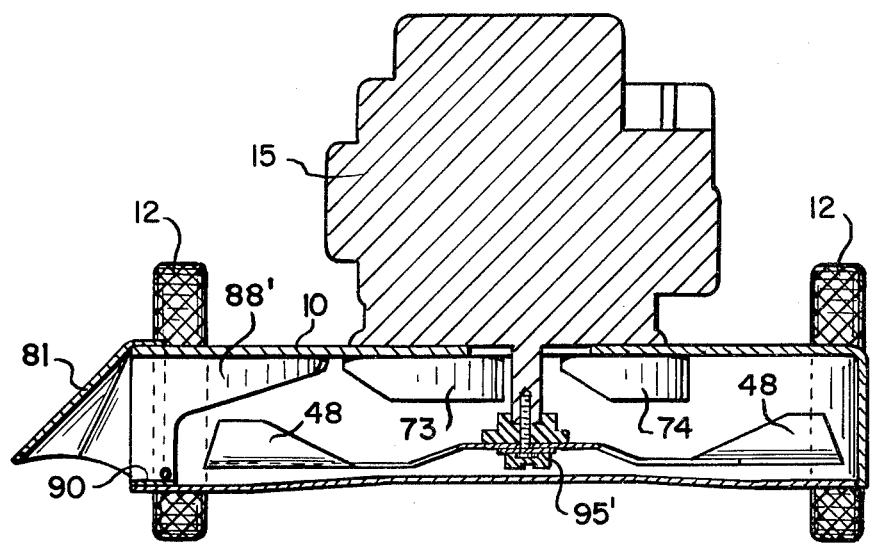
FIG. 16 is a cross-section similar to FIG. 15 but showing a different type rotor.

FIG. 16 is similar to FIG. 15, but shows the use of a one-piece single deck rotor similar to that of FIG. 7. Only one slope at the bottom edge of vane 88' is shown, since the rotor has only one blower vane 48 at each end. Bumper 95' is somewhat thicker in view of the offset in the rotor.

Figure 17:
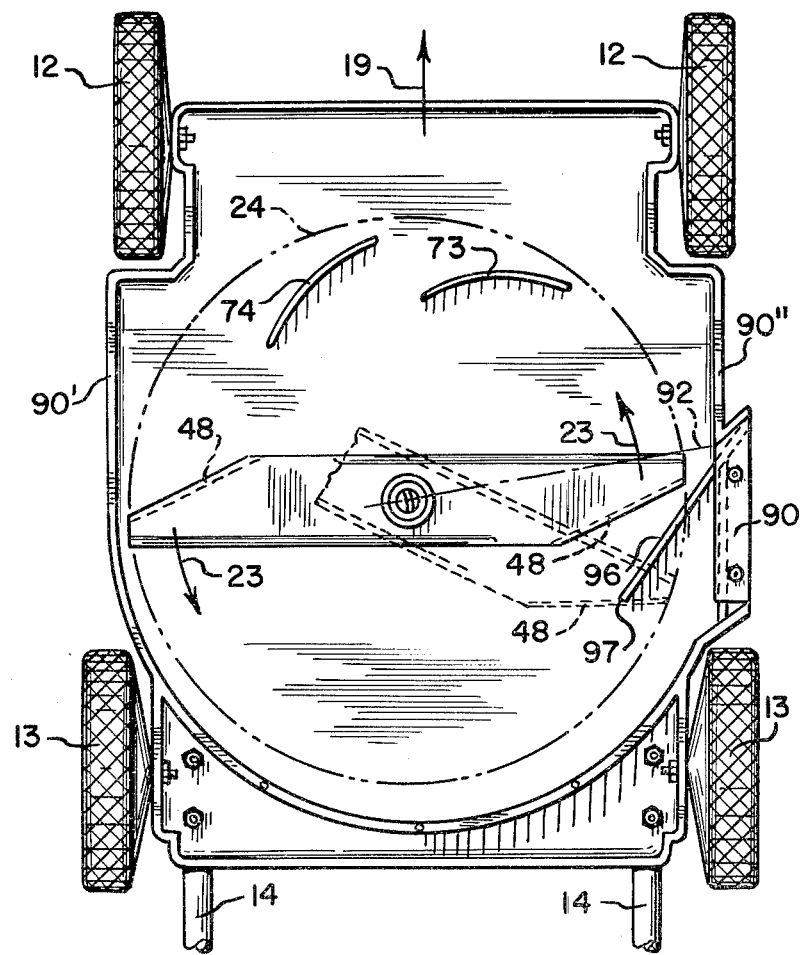
FIG. 17 is a bottom view, with bottom cover removed, showing a modified orientation of the vortex air flow control vane.

Referring to FIG. 17, a straight vortex air flow control vane 96 is shown which is similar to vanes 88 or 88' in FIGS. 14 and 16 but is designed to reduce blower noise while preserving strong vortex air flow and stability. Reduction to noise is obtained by making the angles of the blower vanes and vortex air control vane such that the blower vanes pass under the vortex air control vane in non-parallel relationship. As specifically shown, inner portions of the blower vanes pass under inner portions of the vortex air control vane earlier than outer portions of the blower vanes pass under outer portions of the vortex vane. For simplicity a rotor like FIGS. 16 and 7 is shown, having one blower vane at each end, but it will be understood that dual vanes at each end may also be employed.

In FIG. 17 the angle between vane 96 and radius line 92 is greater than in FIG. 14, and the angle of blower vane 48 is such that point 97 of the blower vane reaches the inner end of the vane 96 at an angular position of the rotor shown in dotted lines. As will be apparent, upon further rotation of the rotor more outward portions of the blower vane will pass under more outward portions of vane 96. Thus the noise generated at the intersection of the blades is distributed in time, and the overall apparent noise is reduced.

In FIG. 17 the side skirt portions 90', 90" extend directly forward toward the front wheels 12, thereby providing a wider space in front of the blower inlet and more separation from the tip circle 24. This may be helpful in some instances to facilitate even mowing at the sides of the swath.

FIG. 18 shows a stepped cover for the outlet which may be used in any of the specific embodiments illustrated, for example for cover 81 in FIG. 15. It is possible, although perhaps unlikely, for a small stone, etc. to be struck in such a manner as to be ejected from the outlet. Conceivably such an object could ricochet off the inside of the cover and/or the ground and fly out beyond the cover. With the stepped construction shown, an object thrown along a path such as 98 will strike a vertical surface and be deflected downward to the ground. Air flow and clippings, however, will tend to follow the general path shown by line 101. Thus a stepped cover like FIG. 18 may be used in applications where other safety features described in this application are not considered to be completely adequate.

In the embodiments so far described, the outlet has been on the side of the mower opposite the side of the first vortex breaker, e.g. outlet 18 in FIG. 5 opposite point 28, and similarly for outlet 64 in FIG. 10 and subsequent embodiments. This allows a long expansion chamber to be employed for effective cross flow action, since the outlet region is angularly spaced far downstream of the inlet region. Also, in FIG. 10 and subsequent embodiments the discharge is directed somewhat forwardly as well as to the side, thereby further protecting the operator. Side bagging may be employed, when bagging of the clippings is desired.

FIGS. 19 and 20 show constructions in which side outlets are used, but the bag 102 is at the rear between the handles 14. An outlet such as 64 in FIG. 10 is extended and a re-entrant chute attached thereto having a forwardly extending horizontal portion 103, an upwardly and inwardly angled elbow 104, and a section 105 extending upwardly and inwardly to bag 102. Suitable flanges, etc. may be provided as desired for convenient attachment and removal. Air exiting from the blower carries the clippings along and they fall down toward the bottom of bag 102. The sides and/or top of bag 102 are advantageously porous to avoid building up back pressure in the blower.

From the viewpoint of bagging, it would be desirable to arrange the outlet between the rear wheels, so that a more direct connection to the bag can be employed. With sufficient height of the blower conduit, this has been found possible while preserving adequate cross flow blower action.

Figure 21:
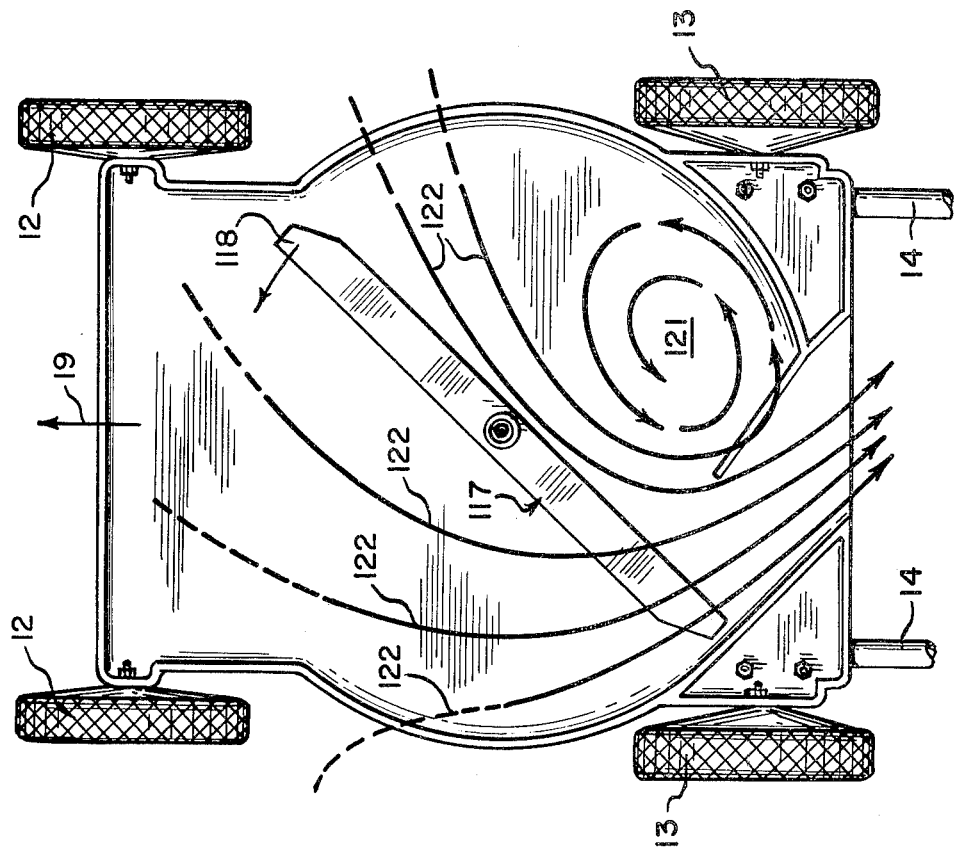
FIG. 21 is a bottom view of a modified blower conduit having a rear outlet.

FIG. 21 is a bottom view of an embodiment in which the blower outlet 111 lies between the rear wheels 13. The side 112 is initially circular and then straightens out at 112' to the leading side 113 of the outlet, thereby providing an expansion region 110. The wall 114 on the other side of the mower extending to the trailing edge 115 of the outlet may also be circular. Bottom plate 116 is secured to the side walls and completely covers the rear semi-circle of travel of rotor 117 as well as the outlet 111. Plate 116 also covers the forward semi-circle of travel except for the cutting ends 118 of rotor 117, the forward boundary of the plate being denoted 116', with laterally extending edges 119, 119'. Rotor 117 is shown similar to FIG. 7.

The tip circle 24 is close to the circular portion of the side wall 112 and also close to the circular side wall 114, the portions of these walls rearward of 119, 119' being side walls of the blower conduit. The length of wall 114 from the trailing side 115 of the outlet and the forward edge 119' of the bottom plate allows sufficient room for the vortex to be generated. This, together with the close spacing of wall 114 to the tip circle, may be sufficient for vortex generation. However, to enhance the vortex generation, and insure a strong stable vortex, a vortex air control vane 120 is employed, similar to vane 96 in FIG. 17. Inlet air flow control vanes are advantageously employed, but are here omitted for simplicity of illustration.

Figure 22:
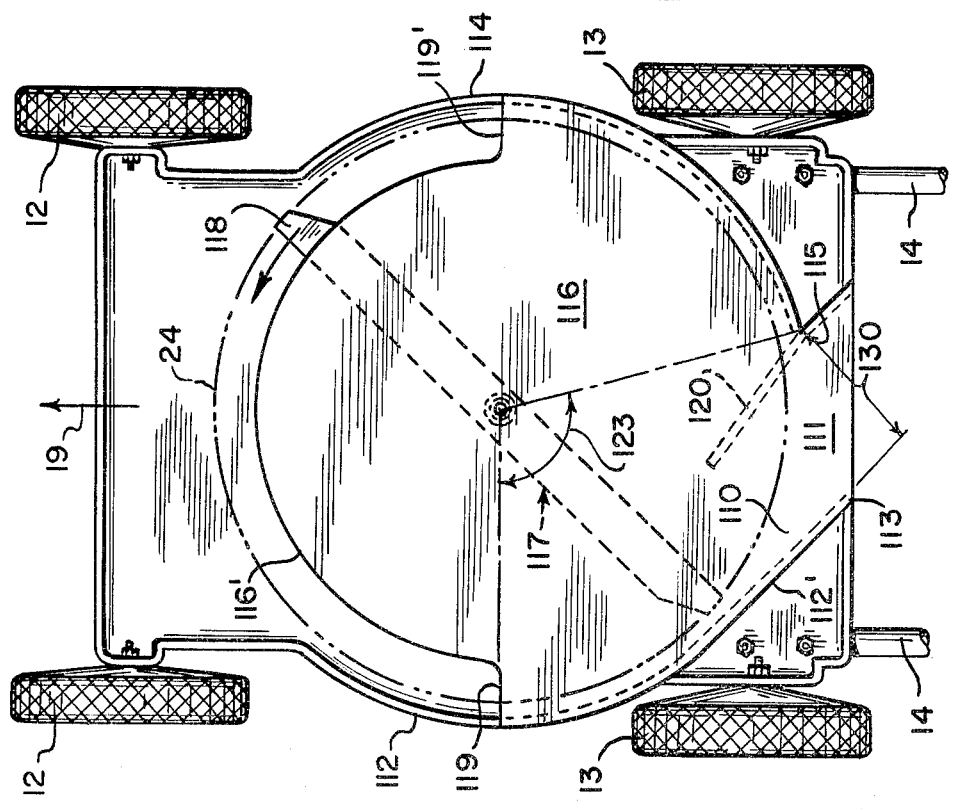
FIG. 22 is similar but with the bottom plate removed and illustrating the air flow pattern.

FIG. 22 shows the general character of air flow. Vortex 121 may be somewhat elliptical, as shown. Air flow into and through the blower conduit is shown by lines 122.

In FIG. 21, the angular spacing of the outlet downstream from the inlet is less than in previous embodiments, and the expansion region is shorter. Although the greater angular spacing and longer expansion in general produces stronger blower action, those shown in FIG. 21 have been found to give adequate performance with sufficient space between the upper and lower walls of the conduit, say about 4 inches. It has been found, however, that the angle 123 between the edge 119 of bottom plate (the trailing side of the inlet region) and the inner edge of the trailing wall 115 of the outlet chute should not be less than about 90 degrees and preferably is considerably greater. Also, experience indicates that the width 130 of the outlet chute should not be greater than about one-tenth the circumference of the tip circle 24, and preferably less.

If desired, bottom plate 116 can be turned clockwise through a small angle, say up to 30 degrees, to provide a longer expansion region, albeit at some sacrifice in cutting width.

As will be apparent, a rear bag may be supplied directly from outlet 111, or a cover guard may be placed over the outlet.

Referring now to FIGS. 23-25, a force-controlled retractable tip rotor is shown of the type employed in the embodiment of FIGS. 13-15. Blade carrier 83 is attached to the motor axle and has upwardly extending blower vanes 86 at its outer ends. Cutting blades 84 have substantially rigid cutting edges and are pivoted at 85 for movement outwardly and forwardly with respect to the direction of rotation 23 of the blade carrier to an extended cutting position as shown in FIG. 25, and rearwardly and inwardly to a retracted position as shown in FIGS. 23 and 24. The blades are resiliently biased by tension springs 125 toward the retracted positions. The sides 126 of the blade carrier are turned down to strengthen the carrier and to provide protection for the pivot regions of the cutting blades. In addition, they are here used as blade stops. Counterweight sections 127 are attached to blades 84 to move their center of mass close to the pivot points, while still leaving a small unbalanced mass in extended and retracted positions, as discussed below. The cutting edges 129 are substantially horizontal when in mowing position, and are downwardly offset at 131 so that the cutting edges are substantially at the same level as the bottom edges of turned down sides 126, or slightly below.

FIG. 25 shows the extended cutting position of blade 84. The trailing portion 87 is upwardly turned and extends backwardly and inwardly, preferably approximately parallel to blower vane 86 and circumferentially spaced therefrom, thereby forming a pair of vanes which channel the air to augment the blower action. A similar pair is at the opposite end of the rotor.

FIG. 26 shows a similar blade, but with curved blower vanes 133. Cutting blades 84 are shown in their retracted positions in full lines, with dotted blade 84′ showing an extended position.

Blower vanes 86 are positioned to stay within the forward portion of bottom plate 54, as is shown in FIG. 13, so that they remain within the blower conduit throughout the rotation, thereby promoting good cross flow blower action. The air flow produced by tip vanes 87 is considered desirable to augment the upward component of air flow at the tip circle adjacent the intake region. Any tendency toward blow-down by tip vortex action is counteracted by the strong inflow to the blower which inhibits the formation of tip vortices. With a large portion of the blower action contributed by vanes 86, vanes 87 can be made fairly small and the blades very light, as is desirable for the force control described below.

However, it is possible, if desired, to rely on the blower vane portions of the blades without blower vanes on the blade carrier. This is illustrated in FIGS. 27, 27a and 27b. Here the blade carrier 83′ is similar to that of FIG. 24, but cutout portions 134 are provided so that the outer portion of the pivoted blades 84 do not contact the blade carrier in the retracted positions shown. The counterbalancing portions 127′ are modified so that they contact down turned flanges 135 to serve as stops in the retracted positions.

As seen in FIGS. 27a and 27b, the counterweight 127′ is provided by a metal sheet which is bent over the portion of blade 84 opposite the cutting portion, and extends around the pivot region 85 on both sides of the cutting blade. As described below, the blade 84 may be made of very thin sheet metal, and the folded over counterweight provides added stiffness in the pivot region, and guards against wear. The same is true of counterweight 127 in FIG. 24. By using a thicker, heavier section close to the pivot point for the counterweight, approximate counterbalance can be obtained without unduly increasing the moment of inertia, as discussed below.

Considering now the force control of the pivoted blades, it should be realized that the centrifugal force on a pivoted blade is very high at the rotational speeds and radii commonly used in rotary mowers. Centrifugal force can be considered to be the product of the effective mass times the square of the circumferential speed, divided by the radius. Thus a blade weighing one-half pound traveling around a circle of 10 inch radius at 12,000 feet per minute, has an effective weight due to centrifugal force of about 750 pounds. This force will act on the effective mass of the blade, and at small angles to the radius from the center of the blade carrier, large tangential forces can be present.

Motors for rotary mowers are generally no larger than required for mowing the grass and disposing of the clippings. They are commonly rated in foot-pounds of torque at a given rpm (revolutions per minute), and commonly fall within a range of 2 to 8 foot-pounds per blade. Thus, at a radius of 10 inches, a tangential force of about 10 pounds can be produced with the larger torque value. Although the torque producible by the motor limits the continuous force available for cutting, if an object is struck the momentum of the blade carrier is so great that momentarily much higher forces are available at the blade pivot and can be applied to an object if the blade is capable of doing so. It will therefore be understood that under the assumed conditions, it is unnecessary for a cutting blade to be capable of transferring more than about 10 pounds for mowing purposes, and any greater capability increases the hazard due to thrown objects, damage to the blade or cutting edge, etc.

When an object is struck by a blade capable of pivoting backward, the moment of inertia of the blade about its own pivot point is important in determining how forcibly the object is thrown. The moment of inertia involves both the mass of the blade and its distribution from the pivot point, and can be considered to be the summation of mass increments multiplied by the square of the radii of the increments from the pivot point.

Inasmuch as the mass of the blade is directly involved in both the centrifugal force produced and the moment of inertia, the blade is made as light as possible compatible with the length of the blade edge desired for cutting (say 2.5 inches or thereabouts), adequate strength and the materials available. The blade is counterbalanced so that the center of mass is close to the pivot point, thereby reducing the torque on the blade due to centrifugal force, but leaving a small unbalance in extended and retracted positions so that the torque will act in a direction to rotate the blade about its axis in the same rotational direction as the blade carrier. The resilient biasing means produces a torque in the opposite direction, and the reduction in torque due to centrifugal force enables a spring of physically realizable size to be employed. The counterbalance is near the pivot point so as not to add unduly to the moment of inertia.

FIGS. 28a and 28b illustrate the forces acting on the blade in fully extended and fully retracted positions. In FIG. 28a, blade 84 is in its fully extended cutting position. The centrifugal force $F_1$ acts radially outward from the axis of rotation of the blade carrier and is effective on the pivoted blade at its effective center of mass denoted 136. Point 136 is offset from the blade axis 85 by a distance $d_1$ perpendicular to $F_1$. Thus the resultant torque $T_1 = F_1 \times d_1$ is counterclockwise, the same as the direction of rotation 23 of the blade carrier. The tension spring exerts a force $F_2$ at point 137, acting at a distance $d_2$ with respect to axis 85. The resultant torque $T_2$ is opposite in direction to $T_1$ and to 23. The difference between these torques is the net torque available for cutting grass.

The cutting force at the tip of the blade is denoted $F_c$ and is at a distance $d_c$ from the blade pivot axis 85. Thus:

$$F_c \times d_c = T_1 - T_2 = F_1 \times d_1 - F_2 \times d_2 \tag{1}$$

The torque producible by motor 15 gives a tangential force $F_m$ at the tip circle 24 of radius $R_t$. Advantageously the tip cutting force $F_c$ is less than a small multiple of the force $F_m$, say less than 3 or 4 times $F_m$, and preferably $F_c$ is not substantially greater than $F_m$. This may be accomplished by suitable choice of the parameters as discussed above.

The continuous tangential force at the blade pivot 85 is also determined by the available motor torque. However, if the blade 84 hits an object and attempts to slow down the blade carrier, the large momentum of the carrier is capable of exerting extremely high forces at pivot point 85. Thus, if the blade does not move backward, it will transmit very high cutting forces to the object. By limiting the cutting force which the blade is capable of transferring, the blade can move backward and the hazard in striking an object is greatly reduced.

In moving backward upon striking the object, angular momentum is imparted to the blade about its pivot point 85. Thus considerable kinetic energy can be delivered to the object. By reducing the moment of inertia, the kinetic energy to the object is reduced.

FIG. 28b illustrates the retracted position of the blade. Here the torque arm $d_1'$ is somewhat greater than $d_1$ in the extended position, but the centrifugal force $F_1'$ is reduced since the center of mass 136 is closer to the blade carrier axis, so that the effects at least partially counteract each other. The spring force $F_2'$ is less, but the effective arm $d_2'$ is greater, thus also at least partially counteracting each other. At mowing rotational speeds, torque $T_1'$ still exceeds torque $T_2'$ so as to urge the blade to an extended position.

Stop means is provided to limit the forward rotation of the blade. This prevents overtravel of the blade in the forward direction which could cause the spring force to travel over center, and eliminates the possibility of the blade hitting an object more or less end on which would seriously damage the blade or tear it from its pivot. Although the stop means may take various forms, it is here provided by down-turned edge 135 of the blade carrier. The stop is positioned so that, in the limited position, torque $T_1$ is at least as great as torque $T_2$. If the torques are approximately equal, then during mowing the blade moves backward sufficiently so that torque $T_1$ exceeds $T_2$ and provides the necessary cutting force. Advantageously the stop is positioned so that $T_1$ exceeds $T_2$ by an amount yielding a tip cutting force at least as great as the force $F_m$ producible by the driving means at the radius of the tip circle 24. Then, during normal mowing, the blade remains against its forward stop and need not oscillate as mowing conditions change.

With the force control feature of the invention, it is possible to employ very thin high strength materials for the extended portion of the blade which performs the cutting, without exceeding the yield strength of the material forming the blade in case it strikes an object. Thus it is unnecessary to sharpen the blade initially, or thereafter in use. A thickness of 0.050 inch will give satisfactory cutting under some mowing conditions, but a thickness of 0.025-0.032 inch is preferred. Materials such as stainless steel and titanium alloys have been used with success, titanium alloys being preferred because of their high yield strength, low weight and better fracture characteristics. These thicknesses, and particularly the 0.025-0.032 range, give cutting edges substantially as sharp as those used in conventional rotary mowers either as initially supplied or after a few hours use. Also, any wear during normal use does not reduce the blade sharpness, so that resharpening is unnecessary.

As an aid to the ready practice of the force control feature of the invention, the following specific values are given, it being understood that they are for illustrative purposes only, and not by way of limitation. The blade 84 was a titanium alloy approximately 0.032 inch thick and weighing about 0.3 ounce, with a counterbalance weighing about 0.6 ounce, giving a total weight of about 0.9 ounce. With stainless steel the corresponding values were 0.55, 0.74 and 1.3 ounces. An unbalance effective in extended and retracted positions, as determined by freely pivoting the counterbalanced blade on a pin and measuring the force at the tip with the blade in vertical and horizontal positions, of the order of 5% and 10%, respectively, of the weight of the blade excluding the weight of the counterbalance, has been employed with success. These percentages allow for some tolerance in manufacture and wear of the blade during use. Spring forces in the range of 10-20 pounds have been employed with success.

At rotational speeds of the blade carrier lower than those normally used for mowing, the centrifugal force on the pivoted blades decreases and is overcome by the spring bias, thereby moving the blades to their retracted positions as shown in FIG. 28b. In the retracted positions the blades will lie within the area of the lower wall of the blower circuit, as will be apparent from FIG. 13. Since the blades are then wholly within the blower conduit, with fixed plate 54 therebelow, added protection is afforded. The dead man's control illustrated in FIG. 12 may be spring biased to reduce the speed of the motor automatically upon release of the control bar 20.

Other means for turnably mounting the blade sections and providing the resilient bias may be used if desired, instead of the pivot and spring arrangement shown, for example, resilient mounting strips, torsion springs, etc. Also, in the case of torsion springs, windup of the spring may be used as a stop.

The dual blower vane feature can also be used in rotors having fixed cutting blade sections. Thus the rotor of FIG. 23 could be changed to have the blades fixed in their extended positions, if the force-controlled pivotal blade feature is not desired.

FIG. 29 shows an embodiment in which curved blower vanes 141 are attached to the rotor inward of the ends thereof. The outer leading edges 142 are the cutting edges. The outer trailing portions are tilted upward at 143 to give some lift. The lift helps to raise the grass near the tip circle, while the strong air inflow of the blower inhibits the formation of tip vortices which would cause blow-down.

In the preceding embodiments the bottom plate forming the lower wall of the blower conduit is fixed to the mower housing. This is preferred from the standpoint of safety, protection of the blade from damage, freedom from scalping, etc., as well as ease of construction.

If desired however, a disk blade carrier could be employed, with the disk forming part of the lower wall of the blow conduit. Such an embodiment is illustrated in FIGS. 30 and 31.

Disk 151 is affixed to the motor shaft 21 and carries cutting blades 152 having upwardly extending blower vanes at their trailing portions. An arcuate bottom plate 153 is attached to the downwardly extending conduit walls to form, with the disk, a lower wall of the conduit similar in overall shape to the lower walls previously described. An air seal is provided between the rotating disk and plate 153. To this end, the entire circumference of disk 151 has a turned down flange 154, and the inner edge of plate 153 has a turned up flange 155. The two flanges are closely adjacent to provide a tortuous path for air flow therebetween. Although the seal is not airtight, sufficient resistance to air flow past the seal can be obtained for the disk 151 and plate 153 to function as the lower wall of the blower conduit. Other sealing means can be employed if desired.

Figure 31:
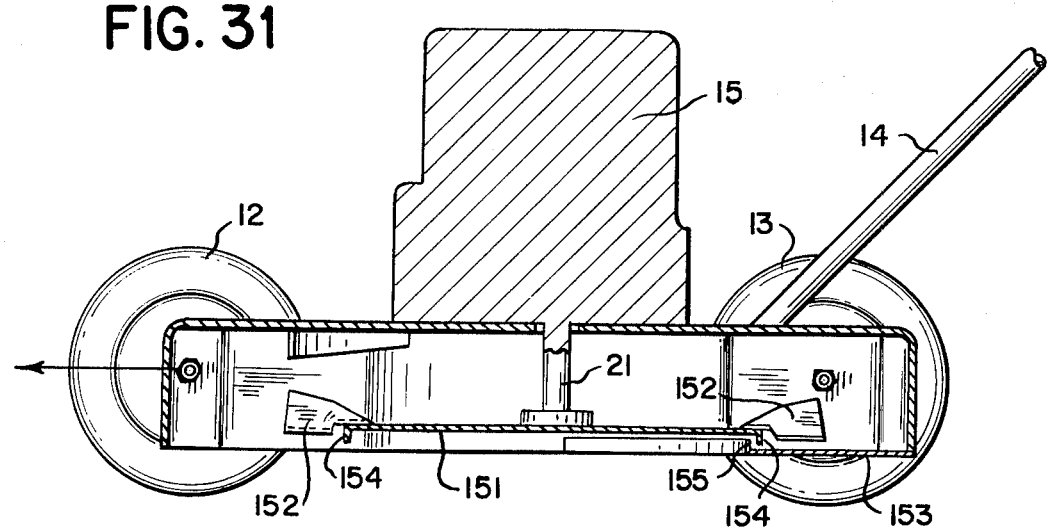
FIG. 31 is a longitudinal cross-section along the line 31—31 of FIG. 30.
Figure 30:
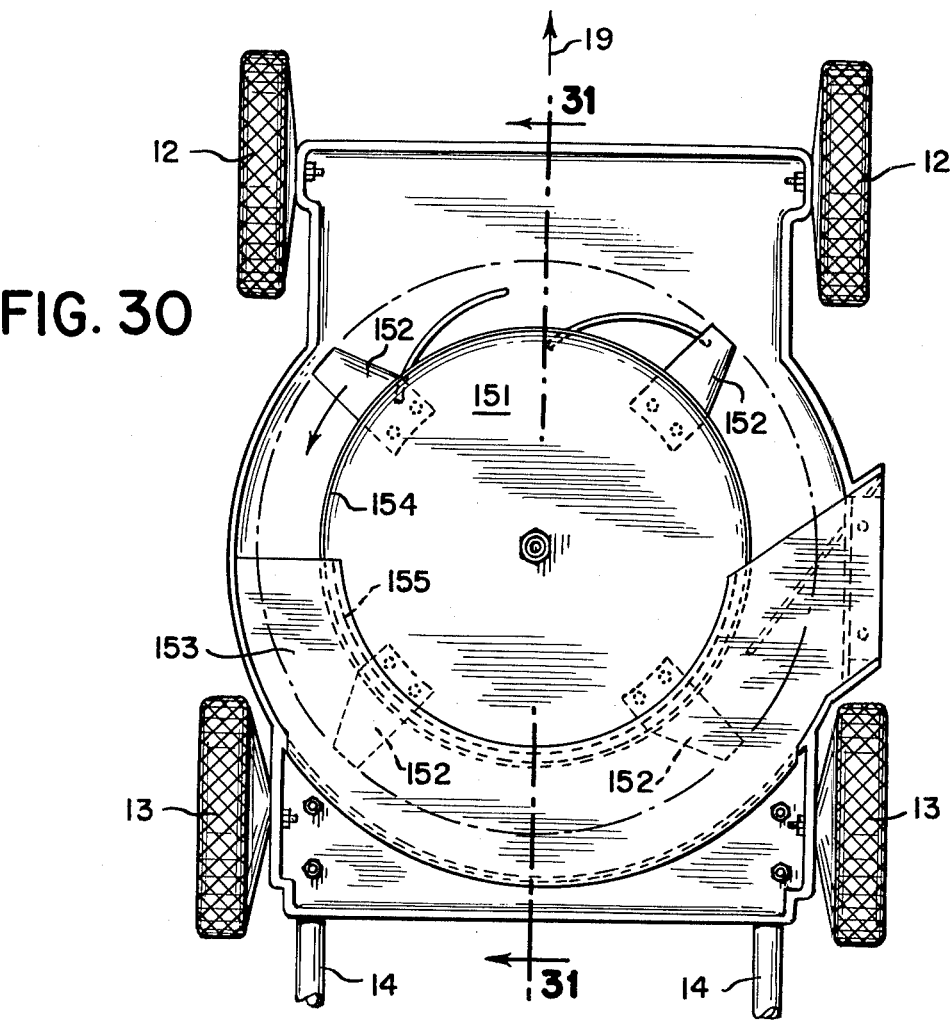
FIG. 30 is a bottom view illustrating an embodiment using a disk blade carrier.

In the specific embodiments described above, the walls of the blower conduit are largely imperforate, except for the disk arrangement of FIGS. 30, 31. Some leakage may be present without seriously impairing the blower action. Also, the forward extension of the deck beyond the tip circle of the rotor, and the front and side walls depending therefrom are shown as imperforate. Here, also, some leakage may be present with sufficiently strong blower action, and judicious use of apertures, louvers, etc. is possible without markedly affecting the desired air flow.

Preferably the bottom wall extends forward just inside the path of the cutting edges for reasons explained above. However, cross flow blower action can be obtained without the forward extension, and if desired the bottom plate could cover only substantially the rear semi-circle of travel of the rotor, albeit with considerable sacrifice in safety and performance. Also, with the forward extension as shown, the lateral extensions of the forward edge could be moved somewhat rearward if desired, and can be angled somewhat forward.

The specific embodiments show only the use of single rotors. However, multiple rotors may be employed to obtain a wider cut, with portions of the conduit side walls used in common by adjacent rotors if desired.

Rotors having blade sections with substantially rigid cutting edges and upwardly bent trailing portions are preferred for best mowing performance, either integral with the rotor or turnably mounted thereon. If desired, however, non-rigid cutting edges such as flexible filaments of nylon, etc. could be used, and the cross flow blower action employed to improve mowing performance, grass handling, disposal of clipping, etc.

The invention has been described in connection with a number of specific embodiments having features which greatly reduce or largely eliminate mowing hazards, without reducing and indeed enhancing the performance of rotary mowers. A number of modifications have been described, and other modifications may be made as suits the requirements of the particular application or the judgment of the designer. Selected features may also be employed and others omitted as desired.

We claim:
1. A cross flow rotary mower which comprises
   (a) a rotor mounted for rotation about a generally vertical axis and driving means therefor,
   (b) said rotor during normal mowing having generally horizontal outer cutting edges and upwardly extending blower vanes spaced outwardly from the rotor axis,
   (c) upper, lower and side walls for forming a conduit cooperating with said rotor to form a cross flow blower having an inlet region and an outlet region angularly spaced downstream from said inlet region,
   (d) said inlet region opening in the forward direction of travel of the mower and having a lateral extent at least as great as a major portion of the tip circle diameter of the rotor during normal mowing with inward flow of air substantially throughout said inlet region,
   (e) said cutting edges and blower vanes traveling within said conduit during at least substantially a semi-circle of rotation of the rotor,
   (f) the extent of said lower wall being a substantial portion of the area of rotation of said rotor including substantially the semi-circle of travel of said cutting edges rearward of said inlet region and said cutting edges extending beyond said lower wall in a major portion of the forward semi-circle of travel of the cutting edges during normal mowing,
   (g) said conduit including means cooperating with said rotor for producing vortex air flow on one side of the rotor axis near the region where said blower vanes pass from said outlet to said inlet regions,
   (h) an extension of said upper wall extending forward substantially beyond the tip circle of said rotor and front and side skirt portions extending downwardly from said extension.

2. A mower according to claim 1 in which the extent of said lower wall of the conduit includes a major portion of the forward semi-circular area of travel of said rotor inside said cutting edges, with said cutting edges extending therebeyond during normal mowing operation.

3. A mower according to claim 1 in which said blower vanes extend inwardly and backwardly with respect to the direction of rotation of the rotor.

4. A mower according to claim 1 in which said rotor includes outer blade sections having leading edges forming said cutting edges and upwardly extending trailing portions forming said blower vanes, said upwardly extending portions extending inwardly and backwardly with respect to the direction of rotation of the rotor.

5. A mower according to claim 1 in which said means for producing vortex air flow includes an air flow control vane extending downwardly from said upper wall of the conduit over the path of travel of said rotor on one side of said axis and adjacent said outlet region.

6. A mower according to claim 5 in which said air flow control vane is positioned substantially between the air flow to said outlet region and the vortex air flow.

7. A mower according to claim 5 in which a radius to the inner end of said air control vane lies angularly ahead of a radius to the outer end with respect to the direction of rotation of the rotor.

8. A mower according to claim 7 in which said blower vanes pass under said air control vane in nonparallel relationship.

9. A mower according to claim 5 in which said air flow control vane extends inwardly from adjacent the trailing side of the outlet region in a non-radial direction, a radius to the inner end of said vane lying angularly ahead of a radius to said trailing side of the outlet region with respect to the direction of rotation of the rotor.

10. A mower according to claim 9 in which said blower vanes of the rotor extend inwardly and backwardly with respect to the direction of rotation of the rotor during normal mowing, said air control vane being positioned so that inner portions of said blower vanes pass under inner portions of the air control vane earlier than outer portions of the blower vanes pass under outer portions of the air control vane.

11. A mower according to claim 1 including at least one inlet air flow control vane extending downwardly over the path of travel of said cutting edges of the rotor forward of said axis of rotation, said vane extending forwardly and inwardly with respect to the direction of rotation of the rotor.

12. A cross flow rotary mower which comprises
   (a) a rotor mounted for rotation about a generally vertical axis and driving means therefor, (b) said rotor during normal mowing having generally horizontal outer cutting edges and upwardly extending blower vanes spaced outwardly from the rotor axis, (c) upper, lower and side walls for forming a conduit cooperating with said rotor to form a cross flow blower having an inlet region and an outlet region angularly spaced downstream from said inlet region, (d) said inlet region opening in the forward direction of travel of the mower and having a lateral extent approximately as great as the tip circle diameter of the rotor during normal mowing with inward flow of air substantially throughout said inlet region, (e) said cutting edges and blower vanes traveling within said conduit during at least substantially a semi-circle of rotation of the rotor, (f) the extent of said lower wall including substantially the semi-circular area of rotation of said rotor rearward of said inlet region and a major portion of the forward semi-circular area of rotation inside said cutting edges, said cutting edges extending beyond said lower wall in a major portion of the forward semi-circle of travel of the cutting edges during normal mowing, (g) said conduit including means cooperating with said rotor for producing vortex air flow on one side of the rotor axis near the region where said blower vanes pass from said outlet to said inlet regions, (h) an extension of said upper wall extending forward substantially beyond the tip circle of said rotor and front and side skirt portions extending downwardly from said extension.

13. A mower according to claim 12 in which said blower vanes are spaced inwardly with respect to the tip circle of the rotor and substantially within the extent of said lower wall of the conduit in the forward semi-circular area of travel of the rotor, and the rotor includes outer blade sections having leading edges forming said cutting edges and upwardly tilted trailing portions.

14. A mower according to claim 12 in which said blower vanes are spaced inwardly with respect to the tip circle of the rotor and substantially within the extent of said lower wall of the conduit in the forward semi-circular area of travel of the rotor, and the rotor includes outer blade sections having leading edges forming said cutting edges and upwardly extending trailing portions forming blower vanes.

15. A mower according to claim 12 in which said means for producing vortex air flow includes an air flow control vane extending downwardly from said upper wall of the conduit over the path of travel of said rotor and spaced from the axis of rotation thereof, said air flow control vane extending inwardly from adjacent the trailing side of the outlet region in a non-radial direction, a radius to the inner end of said vane lying angularly ahead of a radius to said trailing side of the outlet region with respect to the direction of rotation of the rotor.

16. A mower according to claim 12 including at least one inlet air flow control vane extending downwardly over the path of travel of the outer portion of said rotor in the forward semi-circle of travel thereof, said vane extending forwardly and inwardly with respect to the direction of rotation of the rotor.

17. A mower according to claim 16 in which said inlet air flow control vane extends from a radial distance greater than to a radial distance less than and close to respective radial distances to the forward edge of said lower wall of the conduit in corresponding directions.

18. A mower according to claim 17 in which the greater radial distance of said inlet air flow control vane is less than the radius of the tip circle of said rotor.

19. A mower according to claim 12 in which said rotor includes a blade carrier and a cutting blade having a substantially rigid cutting edge turnably mounted on the blade carrier for movement outwardly and forwardly with respect to the direction of rotation of said blade carrier to an extended cutting position and rearwardly and inwardly to a retracted position, said cutting blade being approximately counterbalanced and turnably mounted for yielding an unbalanced mass effective by centrifugal force to produce a torque on the blade in extended and retracted positions thereof in the same rotational direction as the rotational direction of the blade carrier, and resilient biasing means for producing a torque on said blade in extended and retracted positions thereof in a rotational direction opposite to the rotational direction of the blade carrier.

20. A mower according to claim 19 including stop means for limiting the forward rotation of said cutting blade with respect to the blade carrier to an extended position at which said torque produced by centrifugal force is at least as great as said torque produced by said resilient biasing means.

21. A mower according to claim 19 including a plurality of said cutting blades turnably mounted on the blade carrier at circumferentially spaced positions, said blower vanes of the rotor comprising upwardly extending trailing sections of the cutting blades in the extended positions thereof.

22. A mower according to claim 19 in which said blower vanes of the rotor are on said blade carrier, said turnable cutting blade having an upwardly tilted trailing section.

23. A mower according to claim 19 in which said blower vanes of the rotor are on said blade carrier, said turnable cutting blade having an upwardly extending trailing section for forming a blower vane in the extended position thereof.

24. A mower according to claim 23 in which a plurality of said turnable cutting blades are mounted on said blade carrier adjacent said blower vanes respectively to form respective pairs, the blower vane and trailing section of the cutting blade of each pair extending inwardly and backwardly with respect to the direction of rotation of the blade carrier in circumferentially spaced relationship.

25. A mower according to claim 19 in which, at normal mowing rotational speeds of the blade carrier, the difference between the torque produced by centrifugal force on the cutting blade in the extended position thereof and the torque produced by said resilient biasing means yields a tip cutting force of the blade which is less than a small multiple of the force producible by said driving means at the radius of the tip circle of the blade.

26. A mower according to claim 25 including stop means for limiting the forward rotation of said cutting blade with respect to the blade carrier to an extended position at which the tip cutting force of the blade is at least as great as the force producible by said driving means at the radius of the tip circle of the blade.

27. A mower according to claim 25 in which the cutting portion of said cutting blade is of rigid sheet material having a thickness not substantially greater than 0.050 inch.

28. A mower according to claim 25 in which the cutting portion of said cutting blade is of rigid sheet material having a thickness of substantially 0.032 inch or less.

29. A cross flow rotary mower which comprises (a) a housing having a generally horizontal deck, (b) a rotor mounted in said housing for rotation about a generally vertical axis and driving means therefor, (c) said rotor during normal mowing having generally horizontal outer cutting edges and upwardly extending blower vanes spaced outwardly from the rotor axis, (d) side walls extending downwardly from said deck outside the tip circle of said rotor and a bottom wall extending between said side walls beneath said rotor for forming a conduit cooperating with the rotor to form a cross flow blower having an inlet region and an outlet region angularly spaced downstream from said inlet region, (e) said inlet region opening in the forward direction of travel of the mower and having a lateral extent approximately as great as the tip circle diameter of the rotor during normal mowing with inward flow of air substantially throughout said inlet region, (f) said bottom wall covering substantially the semicircular area of rotation of said rotor rearward of said inlet region and a major portion of the forward semicircular area of rotation inside said cutting edges, said cutting edges extending beyond said bottom wall in the major portion of the forward semi-circle of travel thereof during normal mowing, (g) said conduit including means cooperating with said rotor for producing vortex air flow on one side of the rotor axis near the region where said blower vanes pass from said outlet to said inlet regions, (h) said deck extending forward substantially beyond the tip circle of said rotor and front and side skirt portions extending downwardly therefrom.

30. A mower according to claim 29 in which said front and side skirt portions extend downwardly substantially to or below the plane of travel of said cutting edges during normal mowing operation, the spacing of said front skirt portion from the tip circle of said cutting edges being substantially greater than the spacings of the side walls of the conduit from the tip circle at diametrically opposite lateral points of the tip circle.

31. A mower according to claim 29 in which said rotor includes outer blade sections having leading edges forming said cutting edges and upwardly extending trailing portions forming said blower vanes.

32. A mower according to claim 29 in which said blower vanes on the rotor are spaced inwardly with respect to the tip circle of the rotor and travel substantially over the forward region of said bottom wall, and the rotor includes outer blade sections having leading edges forming said cutting edges and upwardly tilted trailing portions.

33. A mower according to claim 29 in which said blower vanes on the rotor are spaced inwardly with respect to the tip circle of the rotor and travel substantially over the forward region of said bottom wall, and the rotor includes outer blade sections having leading edges forming said cutting edges and upwardly extending trailing portions forming blower vanes.

34. A mower according to claim 29 in which said rotor comprises a pair of vertically spaced plate members with said blower vanes mounted between said plate members remote from said axis of rotation, the outer leading edges of the lower plate members being sharp to form said cutting edges.

35. A mower according to claim 34 in which said blower vanes extend inwardly and backwardly with respect to the direction of rotation of the rotor, and said means for producing vortex air flow includes portions of said side walls closely spaced from the tip circle of the rotor on opposite sides of the tip circle to divide said inlet and outlet regions of the blower, at least a portion of the side wall on the side where the blower vanes pass from inlet to outlet regions having a gradually increasing spacing toward the outlet region.

36. A mower according to claim 29 in which said means for producing vortex air flow includes an air flow control vane extending downwardly from said deck over the path of travel of said rotor adjacent said outlet region and spaced from the axis of rotation of the rotor.

37. A mower according to claim 36 in which a radius to the inner end of said air flow control vane lies angularly ahead of a radius to the outer end with respect to the direction of rotation of the rotor.

38. A mower according to claim 37 in which said air flow control vane extends inwardly from adjacent the trailing side of the outlet region and is positioned substantially between the air flow to said outlet region and the vortex air flow.

39. A mower according to claim 29 including at least one inlet air flow control vane extending downwardly over the path of travel of said rotor in the forward semicircle of travel thereof and extending forwardly and inwardly with respect to the direction of rotation of the rotor from a radial distance greater than to a radial distance less than and close to respective radial distances to the forward edge of said bottom wall in corresponding directions.

40. A mower according to claim 39 in which the greater radial distance of said inlet air flow control vane is less than the radius of the tip circle of said rotor.

41. A mower according to claim 29 in which said rotor includes a blade carrier and a cutting blade having a substantially rigid cutting edge turnably mounted on the blade carrier for movement outwardly and forwardly with respect to the direction of rotation of said blade carrier to an extended cutting position and rearwardly and inwardly to a retracted position, said cutting blade being approximately counterbalanced and turnably mounted for yielding an unbalanced mass effective by centrifugal force to produce a torque on the blade in extended and retracted positions thereof in the same rotational direction as the rotational direction of the blade carrier, resilient biasing means for producing a torque on said blade in extended and retracted positions thereof in a rotational direction opposite to the rotational direction of the blade carrier, and stop means for limiting the forward rotation of said cutting blade with respect to the blade carrier to an extended position at which said torque produced by centrifugal force is at least as great as said torque produced by said resilient biasing means.

42. A mower according to claim 41 in which, at normal mowing rotational speeds of the blade carrier, the difference between the torque produced by centrifugal force on the cutting blade in the extended position thereof and the torque produced by said resilient biasing means yields a tip cutting force of the blade which is less than a small multiple of the force producible by said driving means at the radius of the tip circle of the blade.

43. A mower according to claim 42 in which said stop means limits the forward rotation of said cutting blade to an extended position at which the tip cutting force of the blade is at least as great as the force producible by said driving means at a radius of the tip circle of the blade.

* * * * *